US009951196B2

(12) United States Patent
Evers

(10) Patent No.: US 9,951,196 B2
(45) Date of Patent: Apr. 24, 2018

(54) CATIONIC POLYOXOMETALATE-COATED ALUMINA TRIHYDRATE DISPERSANTS

(71) Applicant: J.M. Huber Corporation, Atlanta, GA (US)

(72) Inventor: Glenn R. Evers, Hockessin, DE (US)

(73) Assignee: J.M. Huber Corporation, Atlanta, GA (US)

(*) Notice: Subject to any disclaimer, the term of this patent is extended or adjusted under 35 U.S.C. 154(b) by 883 days.

(21) Appl. No.: 14/059,953

(22) Filed: Oct. 22, 2013

(65) Prior Publication Data

US 2014/0109796 A1    Apr. 24, 2014

Related U.S. Application Data

(60) Provisional application No. 61/717,811, filed on Oct. 24, 2012.

(51) Int. Cl.
*B01J 13/00* (2006.01)
*C08K 3/22* (2006.01)
*D21H 17/66* (2006.01)
*D21H 19/44* (2006.01)
*D21H 19/64* (2006.01)
*D21H 21/08* (2006.01)
*C01F 7/02* (2006.01)

(52) U.S. Cl.
CPC .............. *C08K 3/22* (2013.01); *B01J 13/0047* (2013.01); *D21H 17/66* (2013.01); *D21H 19/44* (2013.01); *D21H 19/64* (2013.01); *D21H 21/08* (2013.01); *C01F 7/02* (2013.01); *C01P 2006/22* (2013.01)

(58) Field of Classification Search
CPC .......... C08K 3/22; D21H 17/66; D21H 19/64; D21H 21/08; D21H 19/44; B01J 13/0047; C01F 7/02; C01P 2006/22
USPC ......................................................... 516/93
See application file for complete search history.

(56) References Cited

U.S. PATENT DOCUMENTS

| 2,187,050 | A | 1/1940 | Patterson |
| 4,376,655 | A | 3/1983 | Weber |
| 5,114,691 | A | 5/1992 | Pinnavaia et al. |
| 5,171,631 | A | 12/1992 | Adkins |

(Continued)

FOREIGN PATENT DOCUMENTS

| WO | WO-96/06225 | 2/1996 |
| WO | WO 97/11029 | 3/1997 |
| WO | WO-2004/015015 | 2/2004 |

OTHER PUBLICATIONS

Shafran et al., "High-Temperature Speciation Studies of Al-Ion Hydrolysis", Advanced Engineering Materials, (Oct. 2004), vol. 6, Issue 10, pp. 836-839 (published online: Nov. 3, 2004).*

(Continued)

*Primary Examiner* — Daniel S Metzmaier
(74) *Attorney, Agent, or Firm* — Merchant & Gould P.C.

(57) ABSTRACT

The present invention relates to polyoxometalate-coated alumina trihydrate dispersants prepared by combining a polyaluminum chloride having certain characteristics with alumina trihydrate particles. Such dispersants are useful for forming cationic alumina trihydrate slurries, which can be mixed with titanium dioxide to produce stable cationic slurry blends useful in paper, paper-board, and paint (coatings) applications. The dispersants are also useful for preparing cationic titanium dioxide slurries.

25 Claims, 8 Drawing Sheets

(56) References Cited

U.S. PATENT DOCUMENTS

| | | | |
|---|---|---|---|
| 5,270,076 A | 12/1993 | Evers | |
| 5,342,485 A | 8/1994 | Armbrust, Jr. | |
| 5,368,692 A * | 11/1994 | Derrick | D21H 21/02 |
| | | | 162/181.8 |
| 5,563,793 A | 10/1996 | Nakaura | |
| 5,824,145 A | 10/1998 | Marganski et al. | |
| 5,985,234 A | 11/1999 | Dulko | |
| 6,043,184 A | 3/2000 | Karmakar et al. | |
| 6,387,500 B1 | 5/2002 | Behl | |
| 6,537,464 B1 | 3/2003 | Shultes, III et al. | |
| 7,172,651 B2 | 2/2007 | Chen et al. | |
| 7,377,975 B2 | 5/2008 | Chen et al. | |
| 7,452,416 B2 | 11/2008 | Evers | |
| 7,906,185 B2 | 3/2011 | Courtenay et al. | |
| 2004/0146665 A1 * | 7/2004 | Beer | B41M 5/5218 |
| | | | 428/32.1 |
| 2004/0255820 A1 * | 12/2004 | Chen | B41M 5/52 |
| | | | 106/31.13 |
| 2007/0014941 A1 * | 1/2007 | Chen | B41M 5/52 |
| | | | 428/32.24 |
| 2008/0131354 A1 | 6/2008 | Li et al. | |
| 2008/0312065 A1 * | 12/2008 | Oswald | B82Y 30/00 |
| | | | 501/134 |
| 2008/0312067 A1 * | 12/2008 | Lortz | B82Y 30/00 |
| | | | 501/153 |
| 2009/0061122 A1 * | 3/2009 | Beer | B41M 5/5218 |
| | | | 428/32.16 |
| 2009/0111906 A1 | 4/2009 | Jacquemet et al. | |
| 2010/0040767 A1 * | 2/2010 | Uibel | A61C 5/08 |
| | | | 427/2.27 |
| 2010/0076167 A1 | 3/2010 | McDaniel et al. | |
| 2010/0203318 A1 | 8/2010 | Galembeck et al. | |
| 2010/0317819 A1 | 12/2010 | De Keyzer et al. | |
| 2011/0003097 A1 * | 1/2011 | Chen | B41M 5/504 |
| | | | 428/32.21 |
| 2011/0189070 A1 | 8/2011 | Suzuki et al. | |
| 2012/0199304 A1 | 8/2012 | Cheng et al. | |
| 2015/0307683 A1 * | 10/2015 | Chinn | C09C 1/3669 |
| | | | 106/444 |

OTHER PUBLICATIONS

Alzofix® P9,Technical Data Sheet, AlzChem AG, Trostberg, Germany (Oct. 2014) p. 1/1, online @ http://www.alzchem.com/sites/default/files/import/datenblatt/en-Alzofix_P9-oct14.pdf (Downloaded Apr. 15, 2016).*

Machine Translation of Publ. No. JP 2002086892 A, published Mar. 2002, Japan patent Office, Tokyo, Japan, obtained online @ http://www19.ipdl.inpit.go.jp/PA1/cgi-bin/PA1INDEX (Downloaded Aug. 12, 2010).*

Zouboulis AI, et al. (2010) Alternative cost-effective preparation method of polyaluminum chloride (PAC) coagulant agent: Characterization and comparative appliction for water/wastewater treatment. *Desalination*, 250: 339-344.

Saraiva MS, et al. (2009) A New Approach for the Modification of Paper Surface Properties Using Polyoxometalate. Materials, 3: 201-215.

International Search Report mailed by the International Bureau dated Jan. 7, 2014 for International Application No. PCT/US2013/066405 filed Oct. 23, 2013 (Applicant—J.M. Huber Corporation; Inventors—Evers) (4 pages).

Written Opinion mailed by the International Bureau dated Jan. 7, 2014 for International Application No. PCT/US2013/066405 filed Oct. 23, 2013 (Applicant—J.M. Huber Corporation; Inventors—Evers) (5 pages).

\* cited by examiner

CATIONIC POLYOXOMETALATE-COATED ALUMINA TRIHYDRATE DISPERSANTS

CROSS-REFERENCE TO RELATED APPLICATIONS

The present application claims the benefit of priority to U.S. Provisional Patent Application Ser. No. 61/717,811, filed on Oct. 24, 2012, which is hereby incorporated by reference in its entirety.

FIELD OF THE INVENTION

This invention relates to cationic dispersants useful in paper, paper-board, and coatings applications.

BACKGROUND OF THE RELATED ART

Alumina trihydrate (ATH) can be used as a filler to produce coatings for paper and paperboard. Because of the relative high cost of titanium dioxide ($TiO_2$), paper mills often replace or extend titanium dioxide with less expensive pigment alternatives, such as ATH, calcium carbonate, kaolin clays and the like. The extender can reduce or eliminate the need for the more expensive white titanium dioxide pigment. Alumina trihydrate ($Al(OH)_3$) represents a special case among typical pigments and fillers. Alumina trihydrate ($Al(OH)_3$) is chemically active and can react with polymers. With a Mohs' hardness of 3, alumina trihydrate is comparatively soft; the Mohs' hardness of titanium dioxide in the rutile modification, for example, is 6.5. The refractive index of alumina trihydrate is comparatively low, at n=1.57.

Paper manufacturers must be able to pump slurry from storage into the paper furnish or into the coating make-up area. In order for an ATH slurry to be considered useable as an extender pigment filler or for grinding into a $TiO_2$ slurry, the total pigment solids content should be greater than 50 wt. %. The prior art discloses dispersed slurries that are stabilized with organic dispersants or surfactants; most of these dispersants or surfactants are anionic in nature in order to be compatible with anionic coating resins used in the paper industry. However, there are prior art cationic pigment slurries which use inorganic polyaluminum chloride (PAC) as the dispersant, but these often develop unacceptably high viscosities over time. In addition, high temperature processing conditions and subsequent thermal aging of the inorganic dispersed polyaluminum chloride slurry result in a loss of effectiveness in retaining other fillers used in the papermakers' wet-end.

U.S. Pat. No. 2,187,050 describes aluminum salts (for example aluminum chloride) that are precipitated from solution and added to $TiO_2$ to effect a surface coating. The neutralization process renders the alumina precipitate a neutral pH and the soluble negative counter ion (sulfate or chloride) is washed away before adding the alumina precipitate to a $TiO_2$ slurry.

U.S. Pat. No. 4,376,655 discloses aqueous titanium dioxide slurries comprising ATH and kaolin clays. The ratio of $TiO_2$ to alumina is between 1000:1 and 2000:1. The ATH usefully can either be a 9-10% aqueous slurry or a 50-55% dried gel. Preferably, the dried gel contains occluded carbonates. The procedure fails to produce cationic dispersed pigments.

U.S. Pat. No. 5,171,631 discloses a titanium dioxide pigment ATH extender/spacer pigment composition comprising 70-98% titanium dioxide by volume and 2-30% ATH by volume wherein the ATH has a similar median particle size as the titanium dioxide. Typically, the median particle size of the titanium dioxide is 0.2 to 0.3 microns. The ATH has a median particle size within ±20% compared to the titanium dioxide particle size. An example of a coating composition comprising the pigments was prepared with titanium dioxide and ATH and contained a cellulosic thickener, associative thickener, propylene glycol, nonionic surfactant, neutralizer defoamer, coalescing agent and biocide, in water at a solids content of 3.23%. Different types of ATH are described and the ATH that was used as a $TiO_2$ spacer had a negative (anionic) charge in order to be compatible with anionic resin-based paints.

U.S. Pat. No. 5,342,485 discloses the use of ATH with improved whiteness in papermaking to reduce costs relative to using solely $TiO_2$. This patent discusses the use of ATH in anionic slurries at 15-30% solids.

U.S. Pat. No. 5,824,145 discloses a photodurable titanium dioxide slurry which comprises at least 78% titanium dioxide particles and at least 3% alumina particles along with an anionic polyacrylic dispersant and additives with a pH of about 6.0 to 9.0.

U.S. Pat. No. 6,387,500 discloses coating formulations for paper and paperboards comprising aqueous slurries of titanium dioxide pigment with extender pigments, which include ATH and calcined clay, and dispersants, which include acrylates. This art is limited to anionic pigment dispersions combined with anionic binders.

U.S. Pat. No. 7,452,416 discloses the use of polyaluminum chloride added by a staged addition during $TiO_2$ slurry grinding. Upon dilution, cationic polyamidoamine-epichlorohydrin polymer (PAE) wet strength resin was added to stabilize the slurry. The anatase $TiO_2$ slurry grind with PAC had no specifications for controlling the grind pH and temperature. The primary stabilizing additive was an expensive organic cationic polymer.

U.S. Pat. No. 7,906,185 discloses cationic boehmite alumina used to surface treat negative charged silica to improve inkjet receptivity, enhance gloss and reduce curl.

U.S. Pat. Nos. 7,172,651 and 7,377,975 disclose pigments suitable for use in coating compositions for inkjet recording media. Surfaces of an inorganic particulate (e.g., alumina trihydrate) are interacted with a water-soluble polyvalent metal salt (e.g., aluminum chlorohydrate) in an aqueous medium. The treated particle surfaces have a "significant" cationic surface charge imparted to them. These references describe pigment surface treatments using aluminum chlorohydrate (ACH) for use in inkjet receptive paper and coatings. The ACH is highly neutralized, weakly cationic alumina that is compatible with anionic latex, having a basicity (activity) of greater than about 50%.

There remains a need to take full advantage of pigments modified with cationic dispersants to decrease the cost of achieving satisfactory opacity in paper and paper-board applications. There is a need for an improved cationic pigmented slurry for enhanced first pass retention and opacity in the sheet. There is also a need for cationic ATH slurry compositions compatible with titanium dioxide slurries that are stable at suitable viscosities. The present invention addresses these and other needs.

BRIEF SUMMARY OF THE INVENTION

The present invention describes a new class of compositions based on forming stable polyoxometalates (POMs) on alumina surfaces, affording new cationic pigment properties that conventionally have not been possible over the pH range of alkaline papermaking. These new compositions comprise a Keggin ion structure that is stable at acidic and neutral pH, under dilute conditions in the presence of stabilizing alumina trihydrate (ATH) particles. These new compositions and the dispersed cationic slurries produced therefrom find application in a wide variety of useful cationic products, including (but not limited to): adhesives, agricultural formulations, biocides, cleaning products, coatings, encapsulation formulations, membranes, performance chemicals, personal care products, sealants, paper and paint coatings.

One aspect of the present invention provides a cationic polyoxometalate-coated alumina trihydrate dispersant (Cationic POM Dispersant) comprising a reaction product of:
a. a polyaluminum chloride having a basicity of about 20 to about 40% and an $Al_2O_3$ content of about 10 to about 17 wt. %; and
b. crystalline alumina trihydrate (ATH) particles;
wherein the Cationic POM Dispersant has a pH of ≤2.5.

Another aspect of the invention provides a method of making a cationic polyoxometalate-coated alumina trihydrate dispersant (Cationic POM Dispersant) comprising combining a polyaluminum chloride having a basicity of about 20 to about 40% and an $Al_2O_3$ content of about 10 to about 17 wt. % with crystalline alumina trihydrate (ATH) particles, wherein the resulting Cationic POM Dispersant has a pH of ≤2.5.

Still another aspect of the invention provides a cationic slurry, comprising water, the aforementioned Cationic POM Dispersant, and inorganic particles, in addition to the crystalline alumina trihydrate particles present as part of the Cationic POM Dispersant, selected from the group consisting of alumina trihydrate particles, titanium dioxide, and mixtures thereof.

For example, the Cationic POM Dispersant can be combined with water to provide a Diluted POM Dispersant. The Diluted POM Dispersant can then be combined with an additional quantity of alumina trihydrate particles to provide an Intermediate $ATH^+$ Slurry The Intermediate $ATH^+$ Slurry can be combined with additional amounts of water to provide, for example, a Paper Grade $ATH^+$ Slurry or a Paint Grade $ATH^+$ Slurry. An $ATH^+/TiO_2$ Slurry can be obtained by combining the Intermediate $ATH^+$ Slurry with titanium dioxide particles. The Diluted POM Dispersant can also be combined with titanium dioxide particles to provide a Cationic $TiO_2$ slurry. These and other embodiments of the invention are outlined in FIG. 2 and described in more detail below.

In another aspect of the invention, an Intermediate $ATH^+$ Slurry is provided which comprises:
a. a Diluted POM Dispersant comprising
  i. about 5 to about 14 wt. % of the aforementioned Cationic POM Dispersant;
  ii. about 86 to about 95 wt. % water;
and
b. crystalline alumina trihydrate particles (ATH) in addition to the crystalline alumina trihydrate particles present as part of the Cationic POM Dispersant;
wherein the Intermediate $ATH^+$ slurry has a pH of between about 2 and about 6.8 and has a total ATH solids content of about 74 to about 84 wt. %.

Still another aspect of the invention provides an Intermediate $ATH^+$ slurry comprising:
a) a Diluted POM Dispersant comprising:
  i. a Cationic POM Dispersant;
  ii. water in an amount sufficient to provide a total ATH solids content of about 1 to about 10 wt. % in the Diluted POM Dispersant;

b) crystalline alumina trihydrate (ATH) particles in addition to the crystalline alumina trihydrate particles present as part of the Cationic POM Dispersant;
wherein the Intermediate $ATH^+$ slurry has a pH of between about 2 and about 6.8 and has a total ATH solids content of about 74 to about 84 wt. %.

The invention in another aspect provides a Paper Grade $ATH^+$ Slurry comprising:
a. an Intermediate $ATH^+$ Slurry comprising
  i. a Diluted POM Dispersant comprising:
    1. the aforementioned Cationic POM Dispersant;
    2. water in an amount sufficient to provide a total ATH solids content of about 3 to about 6 wt. % in the Diluted POM Dispersant;
  ii. crystalline alumina trihydrate particles (ATH)) in addition to the crystalline alumina trihydrate particles present as part of the Cationic POM Dispersant;
  wherein the Intermediate $ATH^+$ Slurry has a pH of between about 2 and about 6.8 and a total ATH solids content of about 74 to about 84 wt. %; and
b. water in an amount sufficient to dilute the Intermediate $ATH^+$ Slurry to a total ATH solids content of about 70 to about 72 wt. %.

Additionally provided by the present invention is a Paint Grade $ATH^+$ Slurry comprising:
a. an Intermediate $ATH^+$ Slurry comprising:
  i. a Diluted POM Dispersant comprising:
    1. the aforementioned Cationic POM Dispersant; and
    2. water at an amount sufficient to provide a total ATH solids content of about 1 to about 4 wt. % in the Diluted POM Dispersant;
  ii. crystalline alumina trihydrate particles (ATH)) in addition to the crystalline alumina trihydrate particles present as part of the Cationic POM Dispersant;
  wherein the Intermediate $ATH^+$ Slurry has a pH of between about 2 and about 6.8 and the total ATH solids content of the Intermediate $ATH^+$ Slurry is from about 74 to about 84 wt. %; and
b. water in an amount sufficient to dilute the Intermediate $ATH^+$ Slurry to a total ATH solids content in the Paint Grade $ATH^+$ Slurry of about 70 to about 72 wt. %.

An aqueous paper stock is also furnished by the present invention, the aqueous paper stock comprising a slurry of water, pulp, titanium dioxide particles, alumina trihydrate particles (in addition to the ATH particles present as part of the Cationic POM Dispersant), and the aforementioned Cationic POM Dispersant. For example, the aqueous paper stock can comprise an aqueous slurry of pulp, titanium dioxide particles, and the aforementioned Paper Grade $ATH^+$ Slurry.

A still further aspect of the invention provides a Cationic $TiO_2$ Slurry, comprising water, titanium dioxide particles and the aforementioned Cationic POM Dispersant.

The invention additionally provides a coating composition, comprising at least one cationic or nonionic resin and the aforementioned Cationic $TiO_2$ Slurry.

Another aspect of the invention provides a paint comprising at least one resin (e.g., a cationic and/or nonionic resin), titanium dioxide particles, and the above-mentioned Paint Grade $ATH^+$ Slurry.

DETAILED DESCRIPTION OF THE INVENTION

Figure 1:
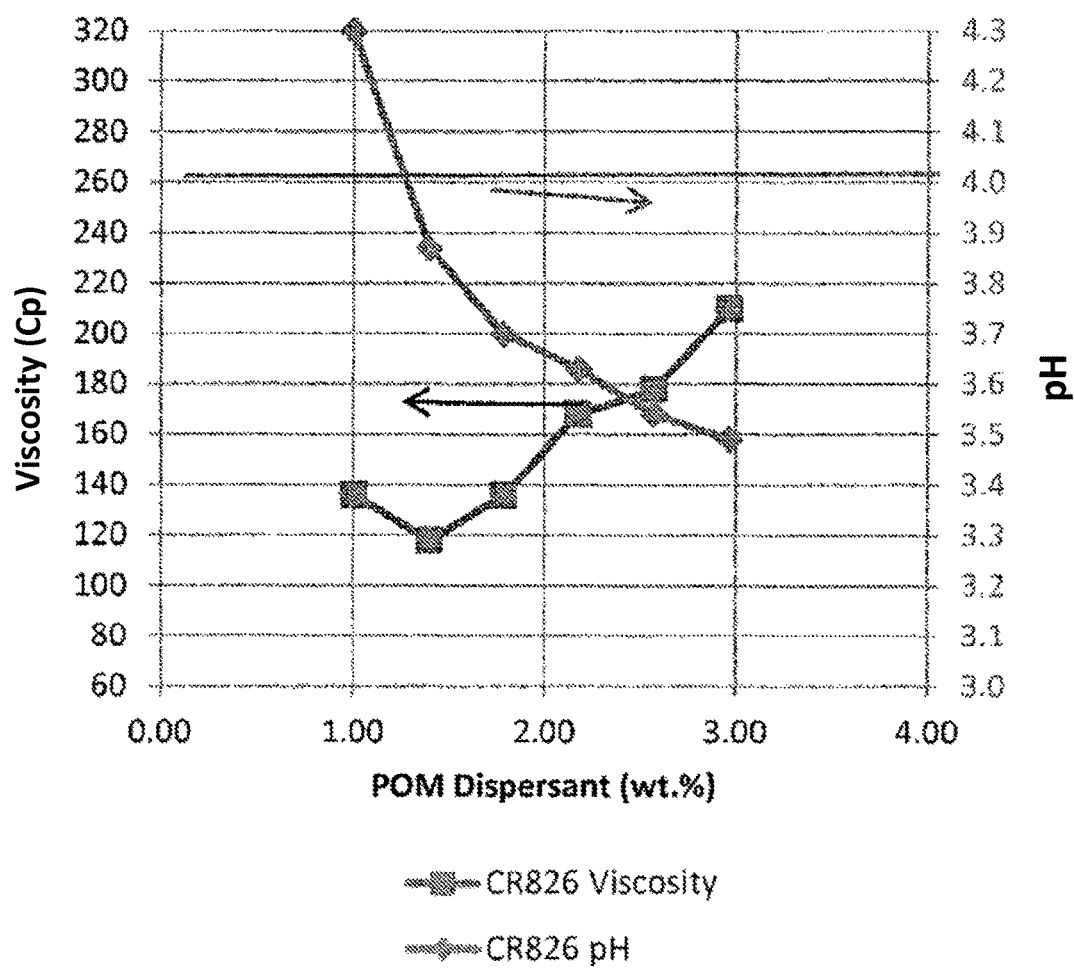
FIG. 1 is a graph showing the effect of the Cationic POM Dispersant concentration on the pH and viscosity of a $TiO_2$ slurry, as explained in more detail in the Examples.
Figure 2:
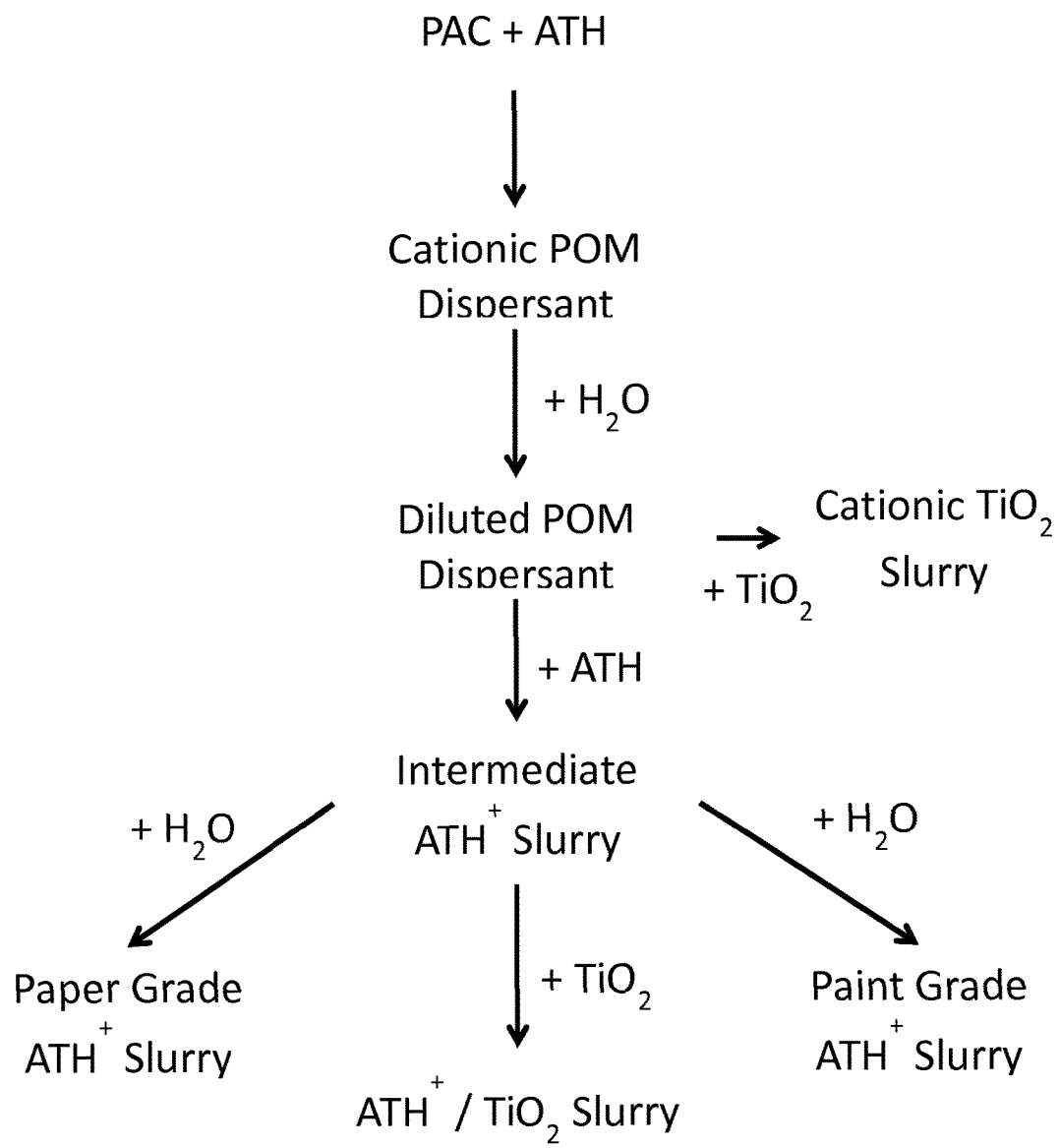
FIG. 2 is a flow chart which outlines how various slurries and other compositions in accordance with the invention can be prepared.

As used herein, alumina trihydrate means alumina trihydrate defined by the chemical formulas $Al_2O_3 \cdot 3HOH$ or $Al(OH)_3$ (sometimes also referred to in the art as hydrated alumina, aluminum trihydrate or aluminum trihydroxide).

The present invention provides cationic alumina trihydrate slurries which are particularly useful in wet-end or coatings in paper and paperboard applications. Such slurries typically have greater than 67% ATH pigment solids and are useful for blending as extender pigments with $TiO_2$ slurries for use in paper and coating applications. The present invention also provides cationic $TiO_2$ slurries for use in coating applications.

The present invention involves the preparation of highly cationic polyoxometalates (POMs) by careful control of the preparation of aluminum of a specific basicity that enhances Keggin (+7) ion formation. A polyaluminum chloride (PAC) can be utilized as the source of the polyoxometalates coated on or closely associated with the surface of the ATH particle component of the cationic POM dispersant. Polyaluminum chloride (PAC) has the general formula:

$$Al(OH)_a Cl_b$$

The basicity of PAC is defined by the ratio a/3 expressed as a %. Starting with a chemical composition, it can be calculated by the following formula:

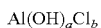

For example, basic polyaluminum chloride that contains 18.33% aluminum based on $Al_2O_3$ and 21.78% chloride and possesses a basicity of 43.1% has an empirical formula: Al(OH) 1.29 Cl 1.71. The basicity calculation is 1.29/3=43%.

U.S. Pat. No. 5,985,234 defines percent basicity (the term typically used in the art, but sometimes also referred to as percent activity) as (% OH)(52.91)/(% Al). On a molar level, this can be expressed as ((OH)/(Al))/3 multiplied by 100. This patent teaches that products will hydrolyze with time producing a basicity greater than that of the initial formulated product. A formulated basicity is used for purposes of selecting particular PACs for use in formulating products in accordance with the present invention.

U.S. Pat. No. 6,537,464 discloses a method for making PAC, including polyaluminum chloride products having a mid-range basicity. The described method makes a liquid product that contains from about 9.8 to 11.0% by weight, e.g., about 10% by weight, of aluminum oxide ($Al_2O_3$) and has about 30 to about 50% basicity. This method is useful to maximize Keggin ion (+7) formation during PAC manufacture, which is optimized by the final aluminum content, expressed as % $Al_2O_3$, % basicity, cooking temperature, starting raw materials, additives and neutralizing agents.

PAC produces a very potent Keggin ion, Al-13, having a (+7) charge, that when added to water attracts negative charged sediment and causes coagulation in waste water to reduce turbidity. One way to prove that the Keggin ion structure is being maintained is by measuring the reduction of turbidity of various waste waters treated with PAC materials. Methods for making an efficient PAC are described by Zouboulis, A. I. and Tzoupanous, N. "Alternative cost-effective method of polyaluminum chloride (PAC) coagulant agent: Characterization and comparative application for water/wastewater treatment", Desalination, 2010, 250, pp 339-344, the teachings of which are hereby incorporated by reference in their entirety for all purposes. Changes in PAC processing temperature, % $Al_2O_3$ and basicity have a large influence on polyoxometalate formation and stabilization. Cationic polyoxometalate structures in the presence of expensive $TiO_2$ pigments can improve pigment self-attraction to negative paper fibers. The various forms of polyoxometalates are described by Casey, William H., "Large Aqueous Aluminum Hydroxide Molecules", Chemical Reviews, 2006, Vol. 106, No. 1, the teachings of which are hereby incorporated by reference in their entirety for all purposes.

For purposes of this invention the PAC utilized should contain a type of POM, namely $AlO_4Al_{12}(OH)_{24}(H_2O)_{12}^{7+}$ (sometimes referred to in the art as simply "$Al_{13}$"), at a level of between 18 to 31% as defined by the experimental techniques described by Zoubolis, A. I. and Tzoupanous, N. "Alternative cost-effective method of polyaluminum chloride (PAC) coagulant agent: Characterization and comparative application for water/wastewater treatment", Desalination, 2010, 250, pp 339-344. That is, in one aspect, the polyaluminum chloride has an $Al_{13}$ with Keggin structure content of 18 to 31%, as measured in accordance with the procedures set forth in the aforementioned article (referred to herein as PAC-K13). For purposes of this invention, the polyaluminum chloride utilized should be a clear liquid having a basicity of about 20% to about 40%, about 25% to about 35%, or about 30% to about 32% and an $Al_2O_3$ content of about 10 wt. % to about 17 wt. %, about 10 wt. % to about 11 wt. %, or about 10 wt. % to about 10.5 wt. %.

For the purposes of this disclosure, the term "PAC" is intended to refer to any polyaluminum chloride, regardless of basicity and/or Keggin structure content. The term "PAC-K", unless specifically stated to the contrary, is intended to refer to a polyaluminum chloride having a basicity of about 20% to about 40% and an $Al_2O_3$ content of about 10 wt. % to about 17 wt. %. Such a PAC-K polyaluminum chloride can comprise Keggin ions. The term "PAC-K13", unless specifically stated to the contrary, is intended to refer to a polyaluminum chloride having an $Al_{13}[AlO_4Al_{12}(OH)_{24}(H_2O)_{12}^{7+}]$ with Keggin structure content of about 18% to about 31%.

Cationic POM Dispersant

The cationic polyoxometalate-coated alumina trihydrate dispersant of the invention (referred to herein as the "Cationic POM Dispersant") is comprised of the reaction product of a polyaluminum chloride, for example, PAC-K and/or PAC-K13, and crystalline alumina trihydrate particles. As a consequence of how the polyaluminum chloride used in the Cationic POM Dispersant is typically prepared (i.e., as an aqueous liquid), the Cationic POM Dispersant generally also contains an amount of water. Without wishing to be bound by theory, the polyaluminum chloride is believed to interact with the ATH particles so as to be deposited or coated on, or otherwise closely associated with, the surface of the ATH particles in a form which provides polyoxometalate species and renders the resulting POM dispersant cationic. Such POM-coated alumina trihydrate particles (ATH$^+$) typically are present as a slurry in water. As used herein, the term "ATH$^+$" is intended to refer to a polyoxometalate coated aluminum trihydrate that exhibits a cationic charge. It should be noted that the "+" notation is intended to reference a cationic charge that can vary, and is not necessarily intended to refer to a charge of +1. For the Cationic POM Dispersant to be effective in dispersing inorganic particles such as a further portion of ATH particles or titanium dioxide particles, the polyaluminum chloride (PAC-K) is selected to have a basicity (sometimes referred to in the art as "activity") of about 20 to about 40%. In one embodiment, the PAC-K basicity is about 25 to about 35%. In another embodiment, the basicity of the PAC-K is about 30 to about 32%. The PAC-K is also selected to have an $Al_2O_3$ content of about 10 to about 17 percent by weight. In one embodiment, the $Al_2O_3$ content of the PAC-K is about 10 to about 11 wt. %. In still another embodiment, the PAC-K has an $Al_2O_3$ content of about 10 to about 10.5 wt. %. PACs meeting such criteria are known in the art and can be obtained from commercial sources such as Eka Chemicals (Akzo Nobel; ATC-8210), Delta Chemical, and Gulbrandsen Technologies. Methods for preparing PACs suitable for use in the present invention are described, for example, in Zoubolis, A. I. and Tzoupanous, N. "Alternative cost-effective method of polyaluminum chloride (PAC) coagulant agent: Characterization and comparative application for water/wastewater treatment", Desalination, 2010, 250, pp 339-344 and U.S. Pat. No. 6,537,464.

In one aspect, a polyaluminum chloride (PAC-K13) can be prepared according to the method of Zoubolis referenced above, by first dissolving granular Al (for example, Aldrich, ~40 mesh, or around 420 µm) in HCl (min 37%). Granular Al can be introduced slowly and in small portions to a preheated (65-70° C.) HCl solution, placed in a 500 mL flask under continuous magnetic stirring. After introduction of the first portion of Al and the beginning of the (exothermic) reaction, further heating is typically not needed. A sodium aluminate solution can be prepared in a similar way, but without heating. A portion of a NaOH solution (10-50%) can then be placed in a 500 mL flask on a magnetic stirrer, where under intensive mixing, granular Al (10-15 gAl/100 mL) can be slowly introduced and dissolved. Various $NaAlO_2$ solutions can be prepared and used for the production of PAC-K13. During the preparations, small portions of acid and base solutions can also be added to replenish the respective loses that occur due to evaporation.

A portion of the prepared aluminum solution can then be placed in a sealed flask on a magnetic stirrer. With the use of a peristaltic pump, an appropriate amount of sodium aluminate solution can be slowly added (0.2 mL/min) under vigorous stirring (1000 rpm). In the very dense sodium aluminate solutions (50% NaOH, N12% Al), a small portion of water can be added to lower the viscosity. The synthesis can take place at various temperatures, e.g. room temperature, 50° C., 70° C. and 80° C.

The aluminum content (Al % w/w) and basicity (%) of a resulting PAC-K13 can be determined according to the American Water Works Association (AWWA) standard for liquid polyaluminum chloride (Denver, Colo., USA, 1999). The distribution of aluminum species can be determined with the application of Al-ferron timed spectrophotometric methods, which are based on the different reaction times of aluminum species with a ferron reagent (8-hydroxy-7-iodo-quinoline-5-sulphonic acid) to form water soluble complexes at pH 5-5.2. These complexes absorb light with a maximum at 370 nm, hence absorbance measurements at this wavelength can allow the calculation of different species of aluminum. Specifically, monomeric Al reacts almost simultaneously (within 1 min) with ferron, while the intermediate polymeric species of aluminum (PAC-K13) reacts slower, i.e. at 120 min. The larger and insoluble polymeric structures (Alc, corresponding mainly to $Al(OH)_3$) need much more time to react, or do not react at all. A UV-Vis spectrophotometer can be used for this purpose.

The polyaluminum chloride employed should be capable of providing the Cationic POM Dispersant with $Al_{13}$ Keggin ions on or associated with the surface of the ATH particles. $Al_{13}$ Keggin ions are highly positively charged and generally correspond to the empirical formula $AlO_4Al_{12}(OH)_{24}(H_2O)_{12}^{7+}$. Thus, in one embodiment of the invention, the polyaluminum chloride (PAC-K13) has an $Al_{13}$ [i.e., $AlO_4Al_{12}(OH)_{24}(H_2O)_{12}^{7+}$] with Keggin structure content of about 18 to about 31% based on active alumina. Such Keggin structure content can be determined in accordance with the procedures described in the aforementioned article by Zoubolis et al. (ferron assay).

Alumina trihydrates useful in the Cationic POM Dispersants of the present invention can be pigmentary grade ATH. In one aspect, the ATH is selected to have an average particle size of at least about 0.1 microns, and can have an upper limit on average particle size as high as 10 microns. In various embodiments, the average particle size of the ATH used in the cationic POM dispersant is from about 0.1 to about 1 microns or from about 0.2 to about 0.5 microns or about 0.25 to about 0.3 microns. Average particle size (d50) can be measured using a SediGraph 5100 particle size analyzer, available from Micromeritics. The ATH can have a gibbsite crystalline form and can have a surface area of, for example, about 1 to about 50 $m^2/g$. Suitable alumina trihydrates useful for preparing the Cationic POM Dispersants are commercially available, including, for example, the ATH sold under the brand name SPACERITE® S-11 by J. M. Huber Corporation having an average particle size of about 0.25 µm and a surface area of about 15 $m^2/g$.

The ATH and PAC, as well as their relative proportions, are selected so that the resulting Cationic POM Dispersant is highly acidic. Thus, the Cationic POM Dispersant has a pH of ≤2.5 (e.g., a pH of from about 2 to about 2.5).

In various embodiments, the Cationic POM Dispersant is comprised of at least about 30 or at least about 45 weight percent of crystalline alumina trihydrate particles but not more than about 60 or not more than about 55 weight percent of crystalline alumina trihydrate particles, with the balance being predominantly or exclusively polyaluminum chloride (PAC-K and/or PAC-K13). In this context, the amount of PAC-K and/or PAC-K13 includes the weight of the water which is also present in the PAC-K and/or PAC-K13 in addition to the solid (non-volatile) component(s). Typically, the amount of water present in the PAC-K and/or PAC-K13 is from about 65 to about 75 weight percent, although more generally the water content can be from about 55 to about 85 weight percent. In certain embodiments, the Cationic POM Dispersant is characterized as consisting essentially of or consisting of crystalline alumina trihydrate particles and PAC-K and/or PAC-K13, including the water typically present in the polyaluminum chloride employed to prepare the Cationic POM Dispersant. For example, where the PAC-K and/or PAC-K13 contains about 65 to about 75 weight percent water, the Cationic POM Dispersant can comprise about 30 to about 60 weight percent ATH and about 40 to about 70 weight percent PAC-K and/or PAC-K13, respectively (the total being 100%, including any water present in the PAC) or about 45 to about 55 weight percent ATH and 45 to about 55 weight percent PAC-K and/or PAC-K13 (the total being 100%, including any water present in the PAC) or about 49 to about 51 weight percent ATH and about 49 to about 51 weight percent PAC-K and/or PAC-K13 (the total being 100%, including any water present in the PAC). In one embodiment, the Cationic POM Dispersant is free of organic polymer.

The Cationic POM Dispersant is prepared by combining the ATH and the PAC-K and/or PAC-K13. According to one embodiment of the invention, the ATH is added slowly to the PAC-K and/or PAC-K13 while mixing (by stirring, for example, with high speed mixing or other thorough agitation being performed to assure good homogeneity in the resulting product). The resulting product can be utilized as an effective dispersant in the preparation of aqueous slurries (i.e., slurries in water) which include inorganic particulates such as additional ATH particles and/or titanium dioxide particles, as described in more detail hereinafter.

The Cationic POM Dispersant can be prepared, in one embodiment of the invention, using about 30 to about 60 weight percent crystalline alumina trihydrate particles and about 40 to about 70 weight percent PAC-K and/or PAC-K13, wherein the PAC-K and/or PAC-K13 is comprised of from about 65 to about 75 weight percent water and from about 25 to about 35 weight percent solids. In this context, "solids" means the components of the PAC-K and/or PAC-K13 which are non-volatile, it being understood that the PAC-K and/or PAC-K13 itself can be in the form of a solution with the non-volatile components being substantially or entirely dissolved in the water to provide a solution. In another embodiment, the Cationic POM Dispersant is prepared using about 45 to about 55 weight percent crystalline alumina trihydrate particles and about 45 to about 55 weight percent PAC-K and/or PAC-K13, wherein the PAC-K and/or PAC-K13 is comprised of from about 65 to about 75 weight percent water and from about 25 to about 35 weight percent solids.

Cationic Alumina Trihydrate (ATH$^+$) Slurries Containing Cationic POM Dispersant The Cationic POM Dispersants of the present invention can be combined with one or more further portions of alumina trihydrate particles to form slurries, with the Cationic POM Dispersant functioning to disperse the additional ATH particles so as to provide more stable, relatively low viscosity slurry even at comparatively high solids content. For example, the total solids content of the ATH$^+$ slurry can be about 50 weight percent or greater, or about 65 weight percent or greater. Generally speaking, the solids content does not exceed about 85 weight percent. In various embodiments of the invention, the ATH$^+$ slurries have a solids content of about 65 to about 84 weight percent. The solids content can be varied and selected as can be desired to meet the requirements of particular end-use applications for the ATH$^+$ slurry, as is described in more detail elsewhere in this document.

The additional ATH particles combined with the Cationic POM Dispersant to provide a ATH$^+$ slurry can be the same as or different from the ATH particles used to prepare the Cationic POM Dispersant. For example, the additional ATH can be a pigmentary grade ATH, can have a surface area of from about 0.3 to about 10 m$^2$/g, and can have a gibbsite crystalline form. The average particle size typically is at least about 0.1 microns or at least about 0.2 microns in order to minimize problems with high thixotropy when the slurry has high solids content, but generally is not greater than about 10 microns. To reduce the extent of settling of the slurry that might otherwise be observed, it can be advantageous for the average particle size of the ATH to not exceed about 2 microns. In one embodiment of the invention, the additional ATH particles have an average particle size that is larger than the average particle size of the particulate ATH utilized in the preparation of the Cationic POM Dispersant. For example, the ATH particles present as part of the Cationic POM Dispersant can have an average particle size of from about 0.2 to about 0.5 microns and the additional ATH particles combined with the Cationic POM Dispersant can have an average particle size of from about 0.8 to about 1.5 microns. Pigment grade (pigmentary) ATH suitable for use as the additional ATH in the ATH$^+$ slurries of this invention is commercially available, including, for example, the J.M. Huber Corporation branded product HYDRAL® 710 having an average particle size of typically about 1 micron and a surface area of about 4 m$^2$/g.

The Intermediate ATH$^+$ Slurry in various embodiments of the present invention can have an ATH solids content of at least 50% by weight, and up to about 70% by weight, e.g., about 67-68% by weight ATH. Grind solids are 74 to 84% solids, or about 77 to 78% solids. As ATH is added to the Cationic POM Dispersant and water, the grind temperature due to heat evolving during mixing should not exceed 80° C. and can, in one aspect, be maintained at less than 70° C. The temperature rise after grinding is controlled by water jacket cooling and/or dilution water addition after "dilatant grinding."

Intermediate ATH$^+$ Slurry dilatant grinding is achieved at 74% solids by increasing the mixer cowles blade rpm so that the slurry thickens due to high shear at the tip of the blade. A slower mixer cowles blade speed allows higher solids grinding until the slurry becomes concentrated, typically at 75-80% solids. During the grinding process, the agitator shaft can vibrate violently until ATH agglomerates are dispersed and commutated in the slurry.

Regulating the rate of dry ATH pigment addition to maintain wet-in is important for manufacturing low viscosity, well dispersed slurries after grinding. Ideally, the height of the agitator blade is initially adjusted from the bottom of the tank so that dilatant ATH$^+$ slurry does not become stuck between the bottom of the moving agitator and the bottom of the tank. Also, ideally the tip of the moving agitator blade must be far enough from the wall of the tank so that the dilatant pigment does not shear thicken at the wall of the tank. Excessive vibration of the tank is experienced when the agitator blade diameter, high rpm and/or high solids is adjusted so that the dilatant grind zone touches the wall. The slurry shear rate that causes dilatant behavior is easily determined by those skilled in the art using a rheometer.

Efficient dilatant grinding requires that a vortex be maintained while the level of the slurry rises during pigment powder addition. The vortex can be maintained by increasing the agitator rpm, adjusting the diameter of the blade and/or raising the agitator blade height during mixing. Optionally, multiple blades stacked on top of each other can be used. In one aspect, the mix tank walls are cylindrical with no wall mounted baffles that will create dead zones where unground slurry can accumulate. Mix grind tanks with insufficient mixing at the walls can be scraped periodically during dilatant slurry grinding to keep build-up from accumulating at the walls. Fast addition of pigment is possible up to 74% solids followed by slower addition to make sure all the powder added falls directly into the vortex with no clumping. Agitator motor amperage is monitored to prevent overloading and overheating the motor. "Design agitator horsepower" is defined as the horsepower required to maintain a dilatant grind vortex so that the agitator blade connection at the shaft can still be seen during pigment grinding at 80% solids. If the vortex is lost and the slurry level covers the blade, the blade will spin within a solid-like hole with no surface mixing, creating a phenomena known as a rat-hole. The resulting unground pigment due to hastened pigment addition results in an undesirable broad particle size distribution.

When steam evolves from the surface of the grind tank, the percent solids can rise above the calculated batch addition calculation due to water evaporation. Ideally, pigment addition is stopped and grinding continued for a minimum of five minutes or until a fluid vortex forms without exceeding 80° C., before cooling with dilution water. It is important to keep the slurry from getting too hot since the viscosity will increase due to thermal aging. Dilution water is added slowly so as to reduce the slurry viscosity but provide enough shear to break up dilatants clumps. Fast addition of water directly to 68-70% solids results in small dilatants clumps dispersed in low viscosity slurry that subsequently plug fine mesh filters between 325 and 100 mesh.

Water used in the preparation of the $ATH^+$ slurries and other slurries of this invention can be deionized. That is, the water has been passed through an ion exchange column to remove unwanted ions that can affect the stability and other properties of the slurries. In one aspect, the metal ion content should be sufficiently low so as to provide a conductivity of less than 5 micro siemens/cm as measured using ASTM method D 1125.

In one aspect of the invention, an Intermediate $ATH^+$ Slurry is provided. Such a composition can be prepared by a procedure in which a Diluted POM Dispersant is combined with crystalline alumina trihydrate particles (in addition to the ATH particles present in the Cationic POM Dispersant used to prepare the Diluted POM Dispersant). The Diluted POM Dispersant can be prepared by combining about 5 to about 14 wt. % of the Cationic POM Dispersant of the present invention and about 86 to about 95 wt. % water (the total being 100 wt. %). In another embodiment, a Diluted POM Dispersant can be obtained by combining a Cationic POM Dispersant of the present invention with water in an amount sufficient to provide a total ATH solids content of about 1 to about 10 wt. % in the Diluted POM Dispersant. When the Diluted POM Dispersant is utilized in a Paper Grade $ATH^+$ Slurry, the total ATH solids content of the Diluted POM Dispersant can be about 3 to about 6 weight %. When the Diluted POM Dispersant is utilized in a Paint Grade $ATH^+$ Slurry, the total ATH solids content of the Diluted POM Dispersant can be about 1 to about 4 weight %. An amount of crystalline alumina trihydrate particles (ATH) in addition to the crystalline alumina trihydrate particles present as part of the Cationic POM Dispersant is combined with the Diluted POM Dispersant effective to provide an Intermediate $ATH^+$ Slurry having a pH of between about 2 and about 6.8 and a total ATH solids content of about 74 to about 84 wt. %.

The Intermediate $ATH^+$ Slurry can be utilized to provide a Paper Grade $ATH^+$ Slurry and/or a Paint Grade $ATH^+$ Slurry, as described hereinafter in more detail.

The invention in another aspect provides a Paper Grade $ATH^+$ Slurry comprising an Intermediate $ATH^+$ Slurry and water in an amount sufficient to dilute the Intermediate $ATH^+$ Slurry to a total ATH solids content of about 70 to about 72 wt. %. The Intermediate $ATH^+$ Slurry is comprised of a Diluted POM Dispersant, which is comprised of a Cationic POM Dispersant in accordance with the invention and sufficient water to provide a total ATH solids content in the Diluted POM Dispersant of about 3 to about 6 wt. %, with the Intermediate $ATH^+$ Slurry being further comprised of crystalline alumina trihydrate particles (ATH) in addition to the crystalline alumina trihydrate particles present as part of the Cationic POM Dispersant. The Intermediate $ATH^+$ Slurry has a pH of from about 2 to about 6.8 and a total ATH solids content of about 74 to about 84 wt. %. Water is present in an amount sufficient to dilute the Intermediate $ATH^+$ Slurry to a total ATH solids content of about 70 to about 72 wt. %. The resulting slurry is useful in the manufacture of paper (for example, as a component of an aqueous paper stock also containing pulp and titanium dioxide particles or as a component of a size press mixture also containing a starch (e.g., an ethoxylated starch) and optionally polyvinyl alcohol and/or a cationic binder such as a water-based cationic polyurethane).

Additionally provided by the present invention is a Paint Grade $ATH^+$ Slurry. Such slurry is comprised of an Intermediate $ATH^+$ Slurry and water. The Intermediate $ATH^+$ Slurry has a pH of from about 2 to about 6.8 and a total ATH solids content of from about 74 to about 84 wt. % and comprises a Diluted POM Dispersant. The Diluted POM Dispersant is comprised of a Cationic POM Dispersant in accordance with the present invention and water at an amount sufficient to dilute the Cationic POM Dispersant to a total ATH solids content in the Diluted POM Dispersant of about 1 to about 4 wt. %. The Intermediate $ATH^+$ Slurry is additionally comprised of crystalline alumina trihydrate (ATH) particles in addition to the crystalline alumina trihydrate particles present as part of the Cationic POM Dispersant.

Cationic $TiO_2$ and $ATH^+/TiO_2$ Slurries

As previously mentioned, the Cationic POM Dispersant of the invention is also useful for preparing cationic slurries of titanium dixoxide particles ("Cationic $TiO_2$ slurries") as well as cationic slurries of blends of alumina trihydrate particles and titanium dioxide particles ("$ATH^+/TiO_2$ Slurries" or "$ATH^+/TiO_2$ Slurry blends").

Prior to the present invention, $ATH^+/TiO_2$ slurries (i.e., slurries of alumina trihydrate and titanium dioxide particles) could not be made that had viscosity and rheology properties suitable for use in paper applications. Surprisingly, the presence of a Cationic POM Dispersant as described herein aids in the wet-in of $TiO_2$ into the cationic slurry during pigment loading and stabilizes the viscosity during thermal aging at 50° C. for one week. When a Cationic $TiO_2$ slurry is made, the Cationic POM Dispersant can be added in an amount of about 1 to about 1.5 wt. % based on the dry weight of $TiO_2$ so as to maintain the final pH below 4.0. The initial pH of the dry $TiO_2$ influences the final slurry pH. The range of Cationic POM Dispersant useful in this embodiment of the present invention generally is from about 0.5% to about 12% by weight based on total solids content. More than about 4 wt. % Cationic POM Dispersant can result in a higher viscosity $TiO_2$ slurry. At least 0.5 wt. % Cationic POM Dispersant is typically needed to enhance the rate of dry $TiO_2$ wet-in during the dispersing process. In another aspect, about 1 to about 1.5 wt. % of the Cationic POM Dispersant can be used.

Titanium dioxide ($TiO_2$) particles suitable for use according to the invention can be any anatase or rutile titanium dioxide known in the art for use as a pigment, and include, for example, materials produced by a chloride process or a sulfate process, such as are commonly practiced in the art. The term "titanium dioxide" can also include zirconia-coated, magnesia-coated, alumina-coated and/or silica-coated titanium dioxide, all of which are well known in the art, or any other surface-modified titanium dioxide such as those treated with an organic silane, siloxane, or polyphosphonate. Commercially available examples of alumina-treated universal grade titanium dioxide products useful in the present invention include TRONOX® 826, DUPONT® R706 and CRISTAL® 596. To improve the long term stability of the Cationic $TiO_2$ slurry (wherein the slurry exhibits no significant increase in viscosity over an extended period of time), it will typically be advantageous to use a titanium dioxide product having both alumina and zirconia surface treatments, such as TRONOX® 828 or KRONOS® 2310. Aminosilane surface treatment of titanium dioxide can optionally be used to impart a cationic charge on the dry pigment before it is incorporated into a composition according to the invention. Typically, the titanium dioxide will be of pigment grade, and will generally be slightly acidic. It will typically have a pH greater than the isoelectric point of the pigment, although this is not required. For example, if the $TiO_2$ isoelectric point pH is 7, then the $TiO_2$ can be supplied having a pH of 8.5. The pH of the dried titanium dioxide particles can be adjusted to a desired value by any means known in the art, including for example treatment with compounds such as ammonium phosphate, triethanolamine, or aminomethylpropanol.

$TiO_2$ having an average particle size of at least 0.25 micron and less than 1 micron is suitable, and more typically the average particle size is between 0.25 and 0.4 microns. In one aspect, $TiO_2$ that is pre-ground to pigmentary size by an air or steam fluid energy mill can be used. Also suitable is $TiO_2$ where the particles have been reduced in size by a wet grinding method, for example as disclosed in U.S. Pat. No. 5,270,076, to break up and disperse aggregates and agglomerates of $TiO_2$.

Advantageously, rutile titanium dioxide can be combined with the Cationic POM Dispersant or an Intermediate $ATH^+$ Slurry of the present invention to provide a mixed $ATH^+$/$TiO_2$ slurry blend having wet-end properties comparable to anionic commercial rutile or anatase slurries, but at a reduced $TiO_2$ concentration. Such mixed slurries are useful for providing at least comparable opacity in paper and paper-board applications at a competitive cost to rutile or anatase $TiO_2$ slurries. An example of a cationic rutile titanium dioxide slurry particularly suitable for use with the Cationic POM Dispersant and $ATH^+$ Slurries of this invention is a titanium dioxide slurry prepared using a "dilatant grinding" technique, especially those produced in accordance with the process of U.S. Pat. No. 5,563,793, the teachings of which are hereby incorporated by reference in their entirety for all purposes.

When a rutile titanium dioxide powder is combined with a $ATH^+$ Slurry of this invention, the $ATH^+$/$TiO_2$ slurry composition comprises about 50% to about 80% cationic titanium dioxide and about 20% to about 50% $ATH^+$ Slurry on a pigment weight basis (the total being 100%). In another aspect, the $ATH^+$/$TiO_2$ slurry composition comprises about 70 to about 80% cationic titanium dioxide and about 20% to about 30% $ATH^+$ Slurry on a pigment weight basis (the total being 100%). The titanium dioxide content can be higher, with conversely lower amounts of ATH. As the titanium dioxide content of the slurry is increased, the opacity achieved at a given slurry concentration is increased, but there is a corresponding increase in the cost of a slurry. An $ATH^+$/rutile $TiO_2$ slurry composition having about 50 wt. % $TiO_2$ and 50 wt. % ATH provides opacity and brightness equal to conventional (100%) anionic rutile $TiO_2$ slurries used in wet-end during paper manufacture. Similar blends of ATH slurries and $TiO_2$ slurries are also useful for cationic coatings, such as ink-jet receptive coatings, architectural paint and paper coatings, and other applications, including plastics.

A Cationic $TiO_2$Slurry in accordance with the invention can be prepared using an excess of Cationic POM Dispersant (i.e., an amount of Cationic POM Dispersant in excess of the amount necessary to achieve a desired viscosity and stability in the slurry). Such a Cationic $TiO_2$Slurry can be supplied in this form to a paint company, for example, that can then utilize the Cationic $TiO_2$Slurry to make a blended cationic pigment slurry grind by combining the Cationic $TiO_2$Slurry with talc, clay, and/or alumina trihydrate (e.g., double precipitated and/or single precipitated ATH). In this aspect, the Cationic POM Dispersant can be used as a dispersant. When a rutile titanium dioxide powder is combined with the Cationic POM Dispersant of this invention, the resulting Cationic $TiO_2$Slurry comprises from about 80 wt. % to about 99 wt. % cationic titanium dioxide and from about 1 wt. % to about 20 wt. % Cationic POM Dispersant on a pigment weight basis (the total being 100%). In another aspect, the Cationic $TiO_2$Slurry comprises from about 96 wt. % to about 99 wt. % cationic titanium dioxide and from about 1 wt. % to about 4 wt. % $ATH^+$ Slurry on a pigment weight basis (the total being 100%). The titanium dioxide content can be higher, with conversely lower amounts of Cationic POM Dispersant. In one aspect, the amount of Cationic POM Dispersant added on the $TiO_2$ is an amount sufficient to render the $TiO_2$ cationic in water with a good pumping viscosity. As the titanium dioxide content of the slurry is increased, there is a corresponding optimum Cationic POM Dispersant concentration to maintain a low viscosity, free flowing slurry. The optimum and lowest cost Cationic POM Dispersant concentration can be determined by adding Cationic POM Dispersant to water and then subsequently adding powdered $TiO_2$ to the slurry until the desired grind solids value is reached. Similar Cationic $TiO_2$Slurries are made by incorporating pigments in a specific order of addition and at concentrations that tend to minimize the release of soluble ions. For example Talc added during $TiO_2$ addition has better viscosity stability. Cationic $TiO_2$ prepared using an excess of Cationic POM Dispersant can allow a paint maker to disperse additional extender pigments that are compatible with an acidic slurry at high solids content, thus eliminating expensive non-ionic surfactants and further minimizing expensive rheology modifiers.

The cationic POM dispersant of the present invention facilitates the preparation of remarkably high $TiO_2$ solids dilatant grinds, without having to resort to the use of organic dispersants. A very high solids $TiO_2$ slurry grind allows a paint manufacturer to hold back dilution water during subsequent mixing into cationic resins. At the end of a paint production run, the held back dilution water is used to wash out agitators, tanks and pump lines, thus flushing any remaining residue into the freshly made high solids cationic paint. It is usually advantageous to flush cationic residues from paint production equipment so that subsequently anionic paint can be processed through the same equipment without having to install separate anionic or dedicated cationic handling facilities.

Characteristics/Properties of the Slurries of the Invention

The $ATH^+$ slurries of the present invention can be high solids slurries comprising at least 50% by weight ATH, and up to 80% by weight ATH, e.g., 67-68% by weight ATH. The ATH$^+$ slurries have good stability. The ATH$^+$ slurries have a low grit content, that is, less than 0.01% unbrushed grit. The high solids ATH$^+$ slurries of this invention have advantageously low viscosity. Viscosity is measured using a Brookfield viscometer. The viscosity of the high solids ATH$^+$ slurries is typically less than 3000 Cps at 100 rpm, using a #4 spindle, less than 1000 Cps, or in the range of 200 to 800 Cps, as measured at room temperature (25° C.) and 68% solids. The ATH$^+$ slurries of this invention can be pumpable. "Pumpable" is defined herein as having a Hercules viscosity of less than 1000 cps, or less than 300 as measured using a Hercules High Shear Viscometer with an "A" bob, a spring setting of 50,000 dynes/cm and 500 rpm shear rate.

The ATH$^+$/TiO$_2$ slurry blends of this invention are useful in paper and paper-board applications. The present invention provides a process for making paper comprising mixing pulp and a slurry comprising ATH$^+$ and cationized rutile TiO$_2$ pigment particles to form a stock and dewatering and drying the stock to form a sheet wherein the slurry comprises (a) at least 50% by weight of dispersed ATH pigmentary particles having an average particle size of at least 0.25 micron (not including the ATH particles forming part of the Cationic POM Dispersant); (b) a Cationic POM Dispersant in accordance with the invention. In one aspect, the ATH$^+$/TiO$_2$ slurry comprises from about 75 to about 50% by weight of rutile TiO$_2$ and from about 25 to about 50% ATH, on a dry solids basis.

The Cationic POM Dispersants of the present invention are additionally useful for preparing coating (e.g., paint) compositions wherein the dispersant is employed to disperse pigment particles, such as ATH, TiO$_2$ and/or talc particles in a liquid medium (typically, an aqueous medium, which can contain water and optionally one or more water-miscible organic solvents) which contains at least one resin (such as a dispersed organic polymer such as an acrylic resin or polymer precursor such as a dispersed epoxy resin, the resin typically being nonionic or cationic in nature) and optionally one or more additional additives conventionally used in coating compositions such as defoamers, leveling agents, rheology modifiers, film formers (coalescing agents) and the like, provided such additives are compatible with the pigments and resin.

For example, the Cationic POM Dispersant can comprise part of a cationic stain block primer paint. Such a paint can be obtained, for example, by preparing a slurry comprised of water, the Cationic POM Dispersant (about 1 to about 5% by weight, based on the dry solids content of the slurry), talc particles and titanium dioxide particles. This slurry can then be combined with additional water, ATH particles, defoamer, a cationic water-borne epoxy resin, a film former and a rheology modifier. The Cationic POM Dispersant can comprise, for example, from about 0.2 to about 0.5 weight percent of the total weight of the resulting cationic stain block primer paint.

At times, it can be necessary to adjust the pH of a slurry in accordance with the present invention to within a desired pH range. An acid is generally used for this purpose. Typical acids suitable for use in the present invention include hydrochloric acid, especially alumina trihydrate dissolved in hydrochloric acid (polyaluminum chloride). The ATH powder added to the cationic water based slurry generally has a high pH. By controlling the base pH of the ATH powder before addition into the acidic PAC/water mixture, the ideal solids and slurry pH can be attained. When used, the selected acidic or basic ATH powder is typically present in the slurry at an amount to maintain the pH of the product slurry in the range of about 2.5 to about 7.0, or from about 3.5 to about 4.0.

Nonionic and cationic commercially available biocides can be used in the slurries of this invention. Examples of such biocides include, but are not limited to cationic quats.

Cationic POM Dispersants with Amphoteric and Anionic Polymers

In another embodiment, the Cationic POM Dispersant of the present invention and slurries prepared therefrom can be utilized together with an amphoteric polymer to increase the filler content of a pulp containing slurry at low basis weights. In one embodiment, the filler content of a paper or paperboard can be increased by: (a) combining a Paper Grade ATH$^+$ Slurry with a pulp slurry, with or without a Cationic TiO$_2$Slurry; (b) combining the resulting mixture with an amphoteric polymer; (c) combining the resulting mixture with an anionic polymer; (d) combining the resulting mixture with functional polymers; and (e) processing the resulting slurry mixture with retention aids to form a sheet of paper or paperboard.

For purposes of this invention a amphoteric polymer is added after the ATH$^+$ assists in depositing of other pigment particles on the pulp fiber. The amphoteric polymer is added in a diluted form, typically less than 1 wt. % into a dilute pretreated fiber (~3 wt. %) furnish. An amphoteric polymer has both anionic and cationic functional groups at various ratios and locations on the polymeric backbone. In one aspect the amphoteric polymer has a particular reactivity. An indication of the desired reactive nature of the amphoteric polymer is determined by mixing a 1 wt. % aqueous solution into concentrated Paper Grade ATH+ Slurry at a 50:50 weight ratio inside a stirred polyethylene container. The resulting mixture quickly thickens and is determined to be a suitable amphoteric polymer if the resulting blend adheres as a gelatinous mass to the wall of the polyethylene container as it is poured out of the container at a 45 degree angle.

In one embodiment, such methods can provide a fast draining, high strength fire retardant paper with very high loadings of ATH on fast paper machines designed for printing and writing paper grades. While not wishing to be bound by theory, it is believed that ATH$^+$ can self-adsorb on pulp fibers due to the opposite charge attraction of the inventive Cationic POM Dispersant or slurries prepared therefrom to negatively charged pulp fibers. In a similar aspect, an amphoteric polymer (having both negative and positive charge), such as, for example, HERCOBOND® HA5305 dry strength resin, when applied to fibers after high loadings of ATH$^+$, can seal the ATH$^+$ onto the fiber, which then can be subsequently coated with a commonly used anionic dry strength resin, such as, for example, HERCO-BOND® 2000 (H2000), to form a coacervate. Similarly, other negatively charged polymers and cellulosic materials, such as, for example, carboxymethylceullolose, can be used. The use of such a dry strength resin can improve the paper strength by bridging across fibers.

In another embodiment, amphoteric and anionic polymers can be added after coating wood or cellulosic fibers with the Cationic POM Dispersant or slurries prepared therefrom. In another embodiment, an alternating charge interaction can be formed, for example, of fiber•ATH$^+$•amphoteric polymer•dry strength resin•amphoteric polymer•ATH$^+$•fiber. As opposite charges attract, the hydroxyl groups on the fiber, the ATH$^+$, and the polymer can interact to strengthen the resulting matrix. As a result, a method which utilizes a Cationic POM Dispersant with amphoteric and anionic polymers can provide a paper having increased stiffness and increased internal bonding, with little or no dusting. A paper prepared with Cationic POM Dispersant and amphoteric and anionic polymers can hold up to about twice the amount of ATH as a similar paper prepared with the Cationic POM Dispersant alone, while maintaining the same or a reduced paper thickness. In other aspects, papers can be prepared having from about 25 wt. % to about 60 wt. % or more ATH, while maintaining a low basis weight when the methods using the inventive cationic POM dispersant, an amphoteric polymer, and an anionic polymer are employed.

The inventions of the present disclosure can be described in a number of aspects, including, but not limited to those described below.

Aspect 1: A cationic polyoxometalate-coated alumina trihydrate dispersant (Cationic POM Dispersant) comprising a reaction product of: a polyaluminum chloride having a basicity of about 20% to about 40% and an $Al_2O_3$ content of about 10 wt. % to about 17 wt. %; and crystalline alumina trihydrate (ATH) particles; wherein the cationic POM dispersant has a pH of ≤2.5.

Aspect 2: The Cationic POM Dispersant of Aspect 1, wherein the crystalline alumina trihydrate particles have an average particle size of about 0.1 μm to about 1 μm.

Aspect 3: The Cationic POM Dispersant of Aspect 1, wherein the crystalline alumina trihydrate particles have an average particle size of about 0.2 μm to about 0.5 μm.

Aspect 4: The Cationic POM Dispersant of Aspect 1, wherein the crystalline alumina trihydrate particles have an average particle size of about 0.25 μm.

Aspect 5: The Cationic POM Dispersant of Aspect 1, wherein the polyaluminum chloride has an $Al_{13}[AlO_4Al_{12}(OH)_{24}(H_2O)_{12}^{7+}]$ with Keggin structure content of about 18% to about 31%.

Aspect 6: The Cationic POM Dispersant of Aspect 1, wherein the polyaluminum chloride has a basicity of about 25% to about 35%.

Aspect 7: The Cationic POM Dispersant of Aspect 1, wherein the polyaluminum chloride has an $Al_2O_3$ content of about 10 wt. % to about 11 wt. %.

Aspect 8: The Cationic POM Dispersant of Aspect 1, wherein the polyaluminum chloride has: a basicity of about 30% to about 32%; an $Al_2O_3$ content of about 10 wt. % to about 11 wt. %; and an $Al_{13}[AlO_4Al_{12}(OH)_{24}(H_2O)_{12}^{7+}]$ with Keggin structure content of about 18% to about 31%.

Aspect 9: The Cationic POM Dispersant of Aspect 1, wherein the crystalline alumina trihydrate particles are in gibbsite form.

Aspect 10: The Cationic POM Dispersant of Aspect 1, prepared using about 30 to about 60 weight percent crystalline alumina trihydrate particles and about 40 to about 70 weight percent polyaluminum chloride, wherein the polyaluminum chloride is comprised of from about 65 to about 75 weight percent water and from about 25 to about 35 weight percent solids.

Aspect 11: The Cationic POM Dispersant of Aspect 1, prepared using about 45 to about 55 weight percent crystalline alumina trihydrate particles and about 45 to about 55 weight percent polyaluminum chloride, wherein the polyaluminum chloride is comprised of from about 65 to about 75 weight percent water and from about 25 to about 35 weight percent solids.

Aspect 12: A method of making a cationic polyoxometalate-coated alumina trihydrate dispersant (Cationic POM Dispersant) comprising combining a polyaluminum chloride having a basicity of about 20% to about 40% and an $Al_2O_3$ content of about 10 wt. % to about 17 wt. % with crystalline alumina trihydrate (ATH) particles, wherein the resulting Cationic POM Dispersant has a pH of ≤2.5.

Aspect 13: The method of Aspect 12, wherein the crystalline alumina trihydrate particles have an average particle size of about 0.1 μm to about 1 μm.

Aspect 14: The method of Aspect 12, wherein the crystalline alumina trihydrate particles have an average particle size of about 0.2 μm to about 0.5 μm.

Aspect 15: The method of Aspect 12, wherein the crystalline alumina trihydrate particles have an average particle size of about 0.25 μm.

Aspect 16: The method of Aspect 12, wherein the polyaluminum chloride has an $Al_{13}[AlO_4Al_{12}(OH)_{24}(H_2O)_{12}^{7+}]$ with Keggin structure content of about 18% to about 31%.

Aspect 17: The method of Aspect 12, wherein the polyaluminum chloride has a basicity of about 25% to about 35%.

Aspect 18: The method of Aspect 12, wherein the polyaluminum chloride has an $Al_2O_3$ content of about 10 wt. % to about 11 wt. %.

Aspect 19: The method of Aspect 12, wherein the polyaluminum chloride has: a basicity of about 30% to about 32%; an $Al_2O_3$ content of about 10 wt. % to about 11 wt. %; and an $Al_{13}[AlO_4Al_{12}(OH)_{24}(H_2O)_{12}^{7+}]$ with Keggin structure content of about 18% to about 31%.

Aspect 20: The method of Aspect 12, wherein the crystalline alumina trihydrate particles are in gibbsite form.

Aspect 21: The method of Aspect 12, wherein an amount of crystalline alumina trihydrate particles is used which is about 30% to about 60% of the total weight of crystalline alumina trihydrate particles and polyaluminum chloride, wherein the polyaluminum chloride is comprised of from about 65 to about 75 weight percent water and from about 25 to about 35 weight percent solids.

Aspect 22: The method of Aspect 12, wherein an amount of crystalline alumina trihydrate particles is used which is about 45% to about 55% of the total weight of crystalline alumina trihydrate particles and polyaluminum chloride, wherein the polyaluminum chloride is comprised of from about 65 to about 75 weight percent water and from about 25 to about 35 weight percent solids.

Aspect 23: The method of Aspect 12, wherein the crystalline alumina trihydrate particles are added to the polyaluminum chloride while mixing.

Aspect 24: A Cationic POM Dispersant produced in accordance with the method of any one of Aspects 12 to 23.

Aspect 25: A cationic slurry, comprising a Cationic POM Dispersant in accordance with any one of Aspects 1 to 11 and 24 and inorganic particles, in addition to the crystalline alumina trihydrate particles present as part of the Cationic POM Dispersant, selected from the group consisting of alumina trihydrate particles, titanium dioxide, and mixtures thereof.

Aspect 26: The cationic slurry of Aspect 25, comprising the Cationic POM Dispersant of Aspect 1 or 8 and $TiO_2$.

Aspect 27: The cationic slurry of Aspect 25, comprising from about 80 wt. % to about 99 wt. % $TiO_2$ and from about 1 wt. % to about 20 wt. % Cationic POM Dispersant.

Aspect 28: The cationic slurry of Aspect 25, comprising from about 96 wt. % to about 99 wt. % $TiO_2$ and from about 1 wt. % to about 4 wt. % Cationic POM Dispersant.

Aspect 29: An Intermediate Cationic $ATH^+$ Slurry comprising: a Diluted POM Dispersant comprising about 5 wt. % to about 14 wt. % of a Cationic POM Dispersant in accordance with any one of Aspects 1 to 11 and 24 and about 86 wt. % to about 95 wt. % water; and crystalline alumina trihydrate (ATH) particles in addition to the crystalline alumina trihydrate particles present as part of the Cationic POM Dispersant; wherein the Intermediate Cationic ATH$^+$ Slurry has a pH of between about 2 and about 6.8 and has a total ATH solids content of about 74 wt. % to about 84 wt. %.

Aspect 30: The Intermediate Cationic ATH$^+$ Slurry of Aspect 29, wherein the Intermediate Cationic ATH$^+$ Slurry has a pH of between about 3 and about 6.

Aspect 31: The Intermediate Cationic ATH$^+$ Slurry of Aspect 29, wherein the total ATH solids content is about 77 wt. % to about 78 wt. %.

Aspect 32: An Intermediate Cationic ATH$^+$ Slurry comprising: a Diluted POM Dispersant comprising: a Cationic POM Dispersant in accordance with any one of Aspects 1-11 and 24 and water in an amount sufficient to provide a total ATH solids content of about 1 to about 10 wt. % in the Diluted POM Dispersant; and crystalline alumina trihydrate (ATH) particles in addition to the crystalline alumina trihydrate particles present as part of the Cationic POM Dispersant; wherein Intermediate Cationic ATH$^+$ Slurry has a pH of between about 2 and about 6.8 and has a total ATH solids content of about 74 wt. % to about 84 wt. %.

Aspect 33: The Intermediate Cationic ATH$^+$ Slurry of Aspect 32, wherein the Diluted POM Dispersant comprises water in an amount sufficient to provide a total ATH solids content of about 3 wt. % to about 6 wt. % in the Diluted POM Dispersant.

Aspect 34: The Intermediate Cationic ATH$^+$ Slurry of Aspect 32, wherein the Diluted POM Dispersant comprises water in an amount sufficient to provide a total ATH solids content of about 1 wt. % to about 4 wt. % in the Diluted POM Dispersant.

Aspect 35: A paper grade cationic alumina trihydrate slurry comprising an Intermediate Cationic ATH$^+$ Slurry comprising a Diluted POM Dispersant comprising: a Cationic POM Dispersant in accordance with any one of Aspects 1-11 and 24; water in an amount sufficient to provide a total ATH solids content of about 3 wt. % to about 6 wt. % in the Diluted POM Dispersant; and crystalline alumina trihydrate (ATH) particles in addition to the crystalline alumina trihydrate particles present as part of the Cationic POM Dispersant; wherein the Intermediate Cationic ATH$^+$ Slurry has a pH of between about 2 and about 6.8 and a total ATH solids content of about 74 wt. % to about 84 wt. %; and water in an amount sufficient to dilute the Intermediate Cationic ATH$^+$ Slurry to a total ATH solids content of about 70 wt. % to about 72 wt. %.

Aspect 36: A paint grade cationic alumina trihydrate slurry comprising: an Intermediate Cationic ATH$^+$ Slurry comprising: a Diluted POM Dispersant comprising: a Cationic POM Dispersant in accordance with any one of Aspects 1 to 12 and 24; and water at an amount sufficient to dilute the Cationic POM Dispersant to a total ATH solids content of about 1 wt. % to about 4 wt. %; and crystalline alumina trihydrate (ATH) particles in addition to the crystalline alumina trihydrate particles present as part of the Cationic POM Dispersant; wherein the Intermediate Cationic ATH$^+$ Slurry has a pH of between about 2 and about 6.8 and the total ATH solids content is from about 74 wt. % to about 84 wt. %; and water in an amount sufficient to dilute the Intermediate Cationic ATH$^+$ Slurry to a total ATH solids content of about 70 wt. % to about 72 wt. %.

Aspect 37: A cationic alumina trihydrate and TiO$_2$ slurry (ATH$^+$/TiO$_2$ Slurry) comprising the Intermediate Cationic ATH$^+$ Slurry of any of Aspects 29-36 and a plurality of cationic TiO$_2$ particles.

Aspect 38: The ATH$^+$/TiO$_2$ Slurry of Aspect 37, comprising from about 50 wt. % to about 80 wt. % cationic TiO$_2$ and from about 20 wt. % to about 50 wt. % Intermediate Cationic ATH$^+$ Slurry on a pigment weight basis.

Aspect 39: The ATH$^+$/TiO$_2$ Slurry of Aspect 37, comprising from about 70 wt. % to about 80 wt. % cationic TiO$_2$ and from about 20 wt. % to about 30 wt. % Intermediate Cationic ATH$^+$ Slurry on a pigment weight basis.

Aspect 40: The ATH$^+$/TiO$_2$ Slurry of Aspect 37, comprising about 50 wt. % cationic TiO$_2$ and about 50 wt. % Intermediate Cationic ATH$^+$ Slurry on a pigment weight basis.

Aspect 41: An aqueous paper stock comprising a slurry of water, pulp, titanium dioxide particles, alumina trihydrate particles, and a Cationic POM Dispersant in accordance with any one of Aspects 1 to 11 and 24.

Aspect 42: The aqueous paper stock of Aspect 41, comprising about 1 to about 10% by weight titanium dioxide and about 25% by weight to about 50% by weight alumina trihydrate.

Aspect 43: The aqueous paper stock of Aspect 41, wherein the titanium dioxide is from about 50 wt. % to about 75 wt. % of the total weight of titanium dioxide and alumina trihydrate.

Aspect 44: An aqueous paper stock comprising a slurry of water, pulp, titanium dioxide particles, and a Paper Grade ATH$^+$ Slurry in accordance with Aspect 35.

Aspect 45: The aqueous paper stock of Aspect 44, comprising about 1% by weight to about 10% by weight titanium dioxide and about 25% by weight to about 50% by weight alumina trihydrate.

Aspect 46: A Cationic TiO$_2$Slurry, comprising water, titanium dioxide particles and a Cationic POM Dispersant in accordance with any one of Aspects 1 to 11 and 24.

Aspect 47: A coating composition, comprising at least one resin and a Cationic TiO$_2$Slurry in accordance with Aspect 46.

Aspect 48: A size press mixture useful for treating paper, comprising a starch and an ATH$^+$ slurry containing a Cationic POM Dispersant in accordance with any one of Aspects 1 to 12 and 24.

Aspect 49: A method of treating paper comprising coating paper with a size press mixture in accordance with Aspect 48.

Aspect 50: A paint, comprising at least one resin, titanium dioxide particles, and a Paint Grade ATH$^+$ Slurry in accordance with Aspect 36.

Aspect 51: A method for treating paper comprising contacting a Paper Grade ATH$^+$ Slurry with a pulp, an amphoteric polymer, an anionic polymer, and optionally one or more functional polymers and/or one or more optional retention aids to form a sheet of paper or paperboard.

Aspect 52: A method for treating paper comprising contacting a Paper Grade ATH$^+$ Slurry with a pulp and optionally with a Cationic TiO$_2$Slurry to form a mixture, combining the mixture with an amphoteric polymer to form a second mixture, combining the second mixture with an anionic polymer to form a third mixture, combining the third mixture with one or more functional polymers, and then processing the resulting slurry mixture with one or more optional retention aids to form a sheet of paper or paperboard.

EXAMPLES

Test Methods

Various test methods were employed to characterize the ATH$^+$ slurries and ATH$^+$/TiO$_2$ ground slurries of this invention. The pH values of the slurries were measured using a Beckman model 200 pH meter. Brookfield viscosity was measured using a standard Brookfield Digital Viscometer, model RVDT, available from Brookfield Engineering Company.

General Process

The slurries of this invention were prepared using a lab scale Greerco disperser, HSD, equipped with a stainless steel 60 mm Cowles blade. All slurry preparations were performed in a cylindrical polyethylene vessel measuring 4 inches in diameter and 6 inches high.

Example 1: Preparation of Cationic POM Dispersant

To a high speed disperser were added equal weights of PAC-K and/or PAC-K13 (ATC 8210, Eka Chemicals, about 70 weight % water and about 30 weight % solids) and 0.25 μm alumina trihydrate (SpaceRite® 5-11, a product of J.M. Huber). The ATH was added slowly into the PAC-K and/or PAC-K13 and mixed at high speed (approx. 1800 to 2000 rpm) for 15 minutes.

Example 2: Preparation of Paper Grade ATH+ Slurry

To a high speed disperser were added quantities of deionized water and the above-described Cationic POM Dispersant (Diluted POM Dispersant) in amounts such that the final Cationic POM dispersant concentration in the Paper Grade ATH+ Slurry was 4.0 wt. % on dry ATH. ATH (HYDRAL® 710 ATH having an average particle size of about 1 μm, obtained from J.M. Huber) was then added slowly at 2000 rpm until a grind solids content of 80 wt. % was achieved and the slurry was then mixed at high speed (approx. 5000 rpm) for 5 minutes resulting in an Intermediate ATH+ Slurry. Additional deionized water was slowly added to dilute to 68% solids, followed by mixing for 10 minutes at low speed to achieve adequate uniformity resulting in the preparation of Paper Grade ATH+ Slurry.

Example 3: Preparation of Cationic TiO$_2$Slurry

To a high speed disperser were added deionized water and the above-described Cationic POM Dispersant (Diluted POM Dispersant) so that the final Cationic POM Dispersant concentration in the Cationic TiO$_2$Slurry was 1.0 wt. % on dry TiO$_2$. Titanium dioxide (Universal grade TiO$_2$ (Tronox® CR826, a product of Tronox, which is a zirconia/alumina-treated rutile pigment)) was then added slowly at 2000 rpm until a grind solids of 80 wt. % was achieved and then mixed at high speed (approx. 5000 rpm) for 5 minutes. Additional deionized water was slowly added to dilute to 73% solids followed by mixing for 10 minutes at low speed to achieve adequate uniformity.

FIG. 1 shows that increased concentrations of Cationic POM Dispersant in accordance with the invention are used to disperse universal grade rutile TiO$_2$ into a cationic charged 73 wt. % solids with reduced viscosity. The ideal pH for viscosity stability is less than 4.

Comparative Example A: Preparation of Comparative PAC/TiO$_2$ Slurry

A comparative PAC based TiO$_2$ slurry was made according to Example 4 of U.S. Pat. No. 7,452,416, as specified herein. Staged addition of polyaluminum chloride (PAC) while adding anatase TiO$_2$ to water yielded a high solids PAC/TiO$_2$ slurry. A small amount of PAC (ATC 8210, from Eka Chemicals) was added to 99 grams of deionized water, followed by dry powder TiO$_2$ addition and then incremental amounts of PAC followed by more TiO$_2$. The incremental addition of PAC and TiO$_2$ resulted in a good dilatant grind at 81.8 wt. % solids. At this point, the mixture was diluted with water and KYMENE® 557 LX PAE resin (Hercules) to 69.9 wt. % TiO$_2$ solids, resulting in a low viscosity TiO$_2$ slurry. The final concentration of PAE resin was 0.21 wt. % (dry PAE on dry TiO$_2$).

Example 4: Evaluation of Opacity of Handsheets

TAPPI standard handsheets were prepared using a 80/20 softwood/hardwood pulp at Canadian Standard Freeness (CSF) of 350 ml at pH 8 and added chemicals in the order of addition specified in Table 1. The general process for preparing handsheets was followed with the compositions described in Table 1. Cationic POM Dispersant containing slurries and comparative PAC/TiO$_2$ and commercial anionic TiO$_2$ were evaluated. In Sample 2, Paper Grade ATH+ Slurry was added separately in the wet-end followed by anionic rutile TiO$_2$ RCS-P. In Sample 3 and 4, Paper Grade ATH+ Slurry was diluted with water to 50 wt. % and anionic rutile TiO$_2$ RCS-P was diluted to 50 wt. % water and then the two were blended together.

As seen in Table 2, evaluation of the opacity of the handsheets using the Cationic TiO$_2$Slurry of Example 3 and the Paint Grade ATH+ Slurry of Example 2 showed markedly improved affinity for pulp fiber when the Cationic POM Dispersant in accordance with this invention was used instead of prior art comparative PAC/TiO$_2$ slurry and conventional anionic TiO$_2$ slurries. Further Sample 2 made using the Paint Grade ATH+ Slurry and Sample 3 using the diluted 50 wt % Paper Grade ATH+ Slurry/diluted 50 wt. % anionic rutile TiO$_2$ RCS-P provided higher opacity than the equivalent 100% TiO$_2$ addition (Samples 6 and 7). In fact, doubling the amount of anionic dispersed TiO$_2$ added as in Sample 9 did not improve opacity.

TABLE 1

Chemical Order of Addition & Quantities for Hand Sheet Tests

| Test Formula Ingredient name | Function Description | Ingredient Supplier | Added (lb./Ton) |
|---|---|---|---|
| Water | | Tap | |
| Pulp (80% HW/20% $^{SW}$) | Substrate | Pulp Mill, @ 0.3% Consistency | — |
| PCC MO | PCC, Extender | Mississippi Lime | 250 |
| HYDROCARB ® 60 | GCC, Extende, | Omya | 10 |
| ASTRO ® X50A | Starch, Cationic | Penford | 7 |
| Size (blend) | ASTRO ® X50A | Penford | 7.5 |
| | ASA | Cytec | 7.5 |
| ATH+ Slurry | | | Table 2 |
| TiO$_2$ | | | Table 2 |
| FENNOSIL ® 515 | Colloidal Silica | Cytec | 0.6 |
| FENNOSIL ® ES210 | Micropolymer, Anionic | Cytec | 5.7 |

TABLE 2

Effect of Cationic TiO₂ Slurry, Paper Grade ATH⁺ Slurry, PAC/TiO₂ Slurry and Anionic TiO₂ on 59 lb Basis Weight Handsheet Paper Opacity

| Additive | Sample # | | | | | | | |
|---|---|---|---|---|---|---|---|---|
| | 1 Dry Wt. Added (Lb/T) | 2 Dry Wt. Added (Lb/T) | 3 Dry Wt. Added (Lb/T) | 4 Dry Wt. Added (Lb/T) | 5 Dry Wt. Added (Lb/T) | 6 Dry Wt. Added (Lb/T) | 7 Dry Wt. Added (Lb/T) | 9 Dry Wt. Added (Lb/T) |
| Ex. 3 Cationic Rutile TiO₂ (CR826) Slurry | 90 | | | | | | | |
| Ex. 2 Paper Grade ATH⁺ Slurry | | 9 | 45 | 90 | | | | |
| Comparative A. PAC/ Cationic Anatase TiO₂ Slurry | | | | | 90 | | | |
| Comparative B Commercial Anionic Rutile TiO₂ CR826 Slurry | | | | | | 90 | | |
| Comparative C Commercial Anionic Rutile TiO₂ RCS-P | | 81 | 45 | 90 | | | 90 | 180 |
| Total Added (lb/T) | 90 | 90 | 90 | 180 | 90 | 90 | 90 | 180 |
| Paper Properties | | | | | | | | |
| Tappi Opacity % | 95.0 | 94.5 | 94.7 | 94.9 | 94.0 | 93.0 | 93.8 | 93.8 |

Example 5: Cationic Stain Block Primer Paint Example

Excess Cationic POM Dispersant in accordance with the present invention imparts a positive charge to talc and TiO₂ particles which are then used to further cationize large particle ATH in paint pigment grinds. The Cationic POM Dispersant is particularly effective on TiO₂ pigments that have alumina and/or zirconia surface treatments called "universal grade" because of their utility in interior and exterior architectural paint applications. Ideally, the amount of Cationic POM Dispersant added should be sufficient to grind the paint pigments at high solids as described earlier while maintaining a pH close to that of the cationic resin so as to maintain resin stability.

Table 3 details a useful cationic stain blocker composition using a Cationic POM Dispersant in accordance with the invention that will quickly block water based stains on many substrates so that the stain does not bleed through the final top coat.

TABLE 3

Chemical Order of Addition & Quantities for Stain Block ATH⁺ Primer

Step A - Cationic Pigment grind

| | Pounds | Gallons | Description |
|---|---|---|---|
| 1. Water | 150 | 18.07 | Water |
| 2. Cationic POM Dispersant | 19 | 1.90 | Cationic Dispersant |
| 3. NICRON ® 403 (Imerys) | 50 | 2.50 | Talc (4.8 um) |
| 4. TRONOX ® CR826 (Tronox) | 686 | 16.50 | Universal GradeTiO₂ |
| 5. Water | 106.8 | 12.87 | Water |
| | 1011.8 lbs | 51.84 | |

TABLE 3-continued

Chemical Order of Addition & Quantities for Stain Block ATH⁺ Primer

Step B - Stain Block ATH⁺ Primer

| Description | Pounds | Gallons | Description |
|---|---|---|---|
| 6. Water | 110.00 | 13.20 | Water |
| 7. Cationic Pigment Grind A from Step A | 217.00 | 11.09 | Cationic TiO₂ Slurry Grind |
| 8. MICRAL ® 932 (J. M. Huber) | 180.00 | 9.00 | ATH (2.5 um) |
| 9. BYK-022 (Byk Chemie) | 0.25 | 0.03 | Defoamer |
| Premix (step 10 & 11) before adding the material resulting from (steps 6-9) | | | |
| 10. DUROXYN ® EF 2107 w/45WA (Cytec) | 460.00 | 51.61 | Cationic WB Epoxy Resin |
| 11. OPTIFILM ® Enhancer 400 (Eastman) or Texanol | 3.00 | 0.37 | Film former |
| 12. ACRYSOL ® RM-845 (Dow) | 8.00 | 0.93 | Rheology Modifier |
| 13. Water | 115.00 | 13.80 | Water |
| Total | 1093.3 | 100.03 | |
| Density Weight: | 10.93 lb/gal 1,126 Pounds | | |
| Volume: | 100 Gallons | | |

TABLE 4

Effect of Behr ® Ultra White All-In-One "Stain Block Plus Primer" Painted Over Drywall Stained with a Blue Crayola Water Washable Magic Marker ® stain and cationic stain blocker on optical values of L* and b*.

| Sample Number | Description | White L* | Blue b* |
|---|---|---|---|
| BT-5 | Control (2 coats over NO Blue Stain) Comp. D Commercial 2 Coat "Stain Block with Primer" | 95.38 | −2.09 |
| BB-2 | Comp D. Commercial 1 Coat "Stain Block with Primer" | 69.80 | −28.17 |

TABLE 4-continued

Effect of Behr ® Ultra White All-In-One "Stain
Block Plus Primer" Painted Over Drywall Stained
with a Blue Crayola Water Washable Magic Marker ® stain
and cationic stain blocker on optical values of L* and b*.

| Sample Number | Description | White L* | Blue b* |
|---|---|---|---|
| BT-6 | Comp. D Commercial 2 Coat "Stain Block with Primer" | 83.97 | −15.76 |
| BT-8 | Table 3 Stain Block ATH+ Primer Example 1 Coat Stain Block ATH+ Primer 1 Coat "Stain Block with Primer" | 94.86 | −2.28 |

Table 4 shows the effect of top coating a commercial all-in-one paint over a water washable Crayola blue Magic Marker® stain on dry wall versus optical values of L* (Closer to 100 is whiter) and b* (negative values=blue tint) bleed through values. A large negative b* value indicates that the dark blue magic marker has bled thru the paint while it was drying and is still visible to the human eye. Commercial all-in-one paint is marketed as an ultra-white paint that does not require a primer over the stain because the primer and stain block are built into a single application of paint. Table 4 shows that both a single coat and a double coat of commercial "Stain block with primer" failed to stop the water soluble blue stain from migrating through the paint as it was drying. The large negative b* values in BB-2 and BT-6 are visible as blue stains in the final coating and the lower L* values relative to BT-5 (control) and BT-8 (Stain BlockATH+ Primer) indicate that the final cured paint coating is not white. Stain Block Primer made according to the formula specified in Table 3 does a remarkable job of stopping water based stains from migrating through the paint. It is even more remarkable that the first primer coat only had a 0.5 hour dry time. Sample BT-8 shows the b* optical value is so small that the blue stain has been completely blocked from migrating into the second coating using the control commercial paint.

Example 6: Inkjet Example

Another example of the usefulness of the Cationic POM Dispersants of the present invention in coatings is the use of Paper Grade ATH+ Slurry as a papermaking size press additive to improve inkjet images. The paper industry uses a 5 wt. % calcium chloride solution with 15 wt. % ethoxylated starch to size press a paper surface treatment suitable for receiving pigmented ink jet droplets on the dry paper product. Since calcium chloride is soluble in water and penetrates deeply into the sheet, some of the inkjet trapping chemical migrates away from the paper surface deep into the sheet. A low surface charged calcium ion (+2) combined with deep penetration away from the paper surface provides less than adequate inkjet color density at the surface.

Ink jet droplets applied to paper need to be trapped at the paper surface so as to have a high color density. Complicating the surface charged attraction is the observation that not all colors are retained at the surface equally. For example, of the four colors, black, magenta, yellow and cyan, magenta can have lower inkjet density. One method is to destabilize the negative charged ink jet droplets by attracting them to calcium +2 charges at the surface, but this does not solve the problems with differential color density. Another method provided by this invention is to attract the inkjet droplets to a very white ATH surface that is pretreated with a Cationic POM Dispersant in accordance with the invention. The large ATH particles stay localized to the surface of that paper providing a useful whiteness and Tappi brightness while at the same time providing a positive charged receptive surface layer.

Internally, Alkenyl Succinic Anhydride (ASA) sized, 75 gm/m$^2$ base sheet was rod coated with 14 gm/m$^2$ size press solution. Papers were dried at 90° C. and tested on an HP 950C inkjet printer. Solid Color density patterns for Cyan, magenta, yellow and black were printed and measured using an X-Rite Reflection Densitometer, Model 408.

TABLE 5

Effect of Calcium Chloride, Paper Grade ATH+ Slurry and
Hydroxyethylated Starch Size Press Solution on Inkjet Color Density

| Size Press Mixture | Cyan | Magenta | Yellow | Black |
|---|---|---|---|---|
| Starch/CaCl$_2$/Whitener (Comparative) | 0.95 | 0.81 | 0.81 | 1.00 |
| Starch/Paper Grade ATH+ Slurry Prepared using Cationic POM Dispersant (Invention) | 1.10 | 0.99 | 0.96 | 1.30 |

Table 5 shows that paper treated with ATH dispersed by a Cationic POM Dispersant in accordance with the present invention has higher inkjet color density than paper treated with a commercial CaCl$_2$ size press solution.

Example 7: Cationic POM Dispersant with Amphoteric and Anionic Polymer Example

For the following examples, weight % refers to the weight % of active polymer solids and excludes the aqueous solution. Product dosages are expressed as active (solids) material as a percentage of the total dry material being treated (wood fiber plus filler and other additives); water is excluded from the calculation.

Preparation of Fire Retardant Paper Samples

In this example, fire retardant paper samples were prepared using a Paper Grade ATH+ Slurry and either retention aids alone or a combination of amphoteric and anionic polymers. In this example, the goal was to increase the filler (e.g., ATH) content of the sheet, for example, as determined by ash measurements. In this example, the Paper Grade ATH+ Slurry can be added to a slurry of pulp. The resulting mixture can then be combined with a functional amphoteric polymer and one or more functional wet-end chemicals, such as, for example, a cationic starch, an anionic polymer, a cationic wet strength polymer, and/or a cationic AKD sizing agent. This mixture can then be combined with one or more wet-end retention aids, such as, for example, cationic polyacrylamide (PAM), anionic silica, an anionic polymer or anionic micro-polymer, and/or PAC-K or PAC-K13. This mixture can then be processed to form a sheet of paper or paperboard.

Figure 3:
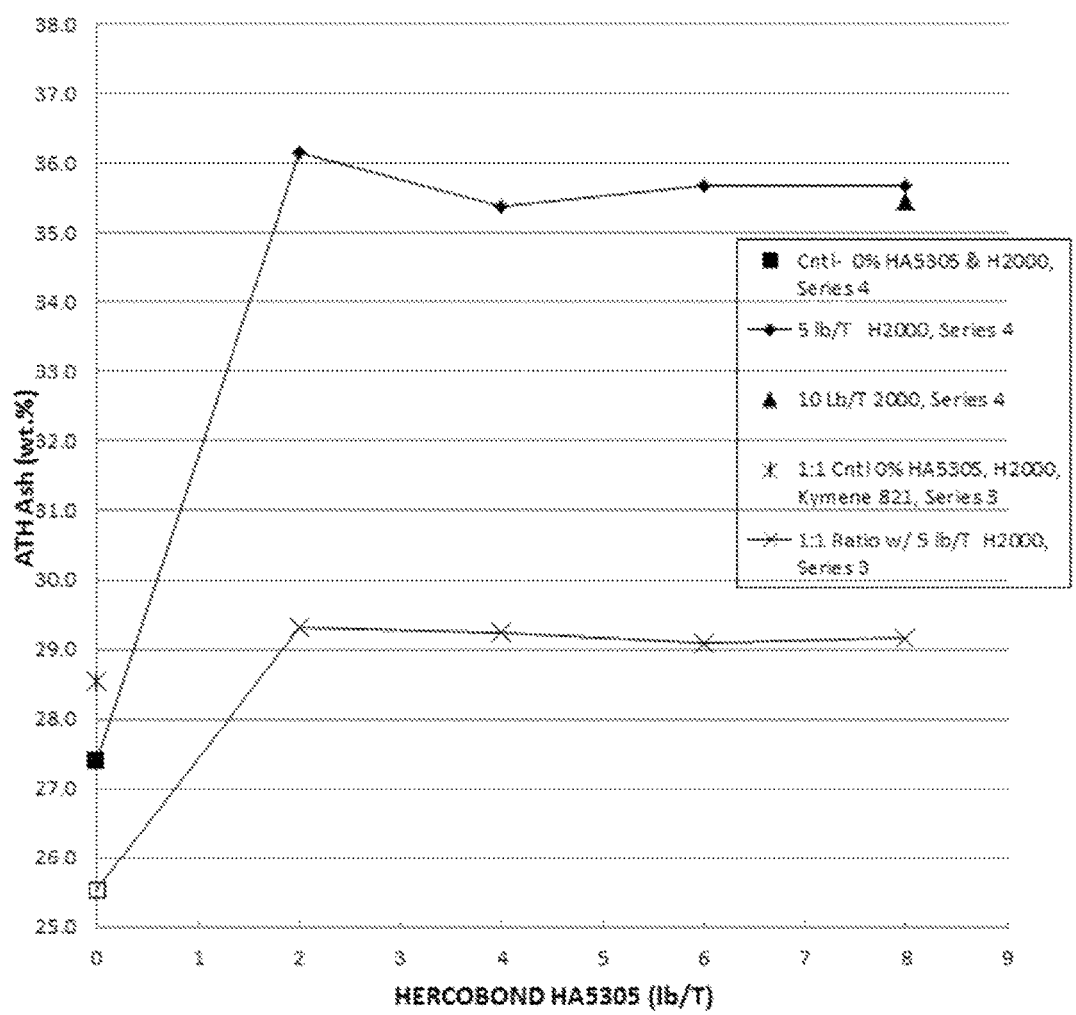
FIG. 3 illustrates the effect of amphoteric and anionic polymers on Cationic POM Dispersant containing fire retardant papers.
Figure 4:
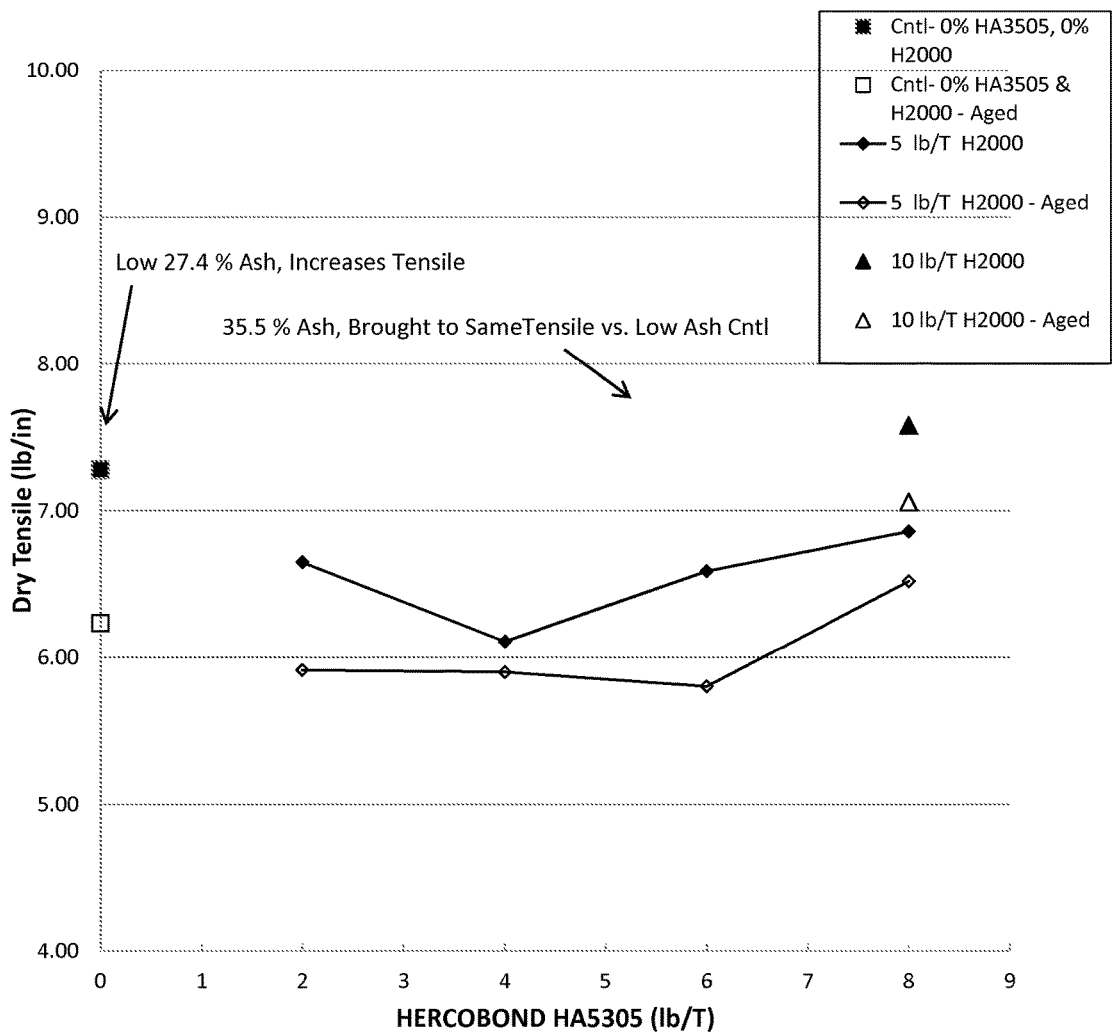
FIG. 4 illustrates the dry tensile strength of Cationic POM Dispersant containing papers.

As illustrated in FIG. 3, the sample using the Paper Grade ATH+ Slurry with amphoteric and anionic polymers (HERCOBOND® HA5305 and HERCOBOND® H2000, respectively) could be prepared with a significantly higher filler content (i.e., about 35 wt. % ash vs. about 29 wt. % ash), as compared to the sample prepared with the Paper Grade ATH+ Slurry alone. Moreover, adjusting the ATH:pulp ratio enables a larger amount of ATH to be attached to the fiber surface of the paper. FIG. 4 illustrates the improvement in tensile strength that can be achieved upon further addition of an anionic polymer, such as, for example, HERCOBOND®

Figure 5:
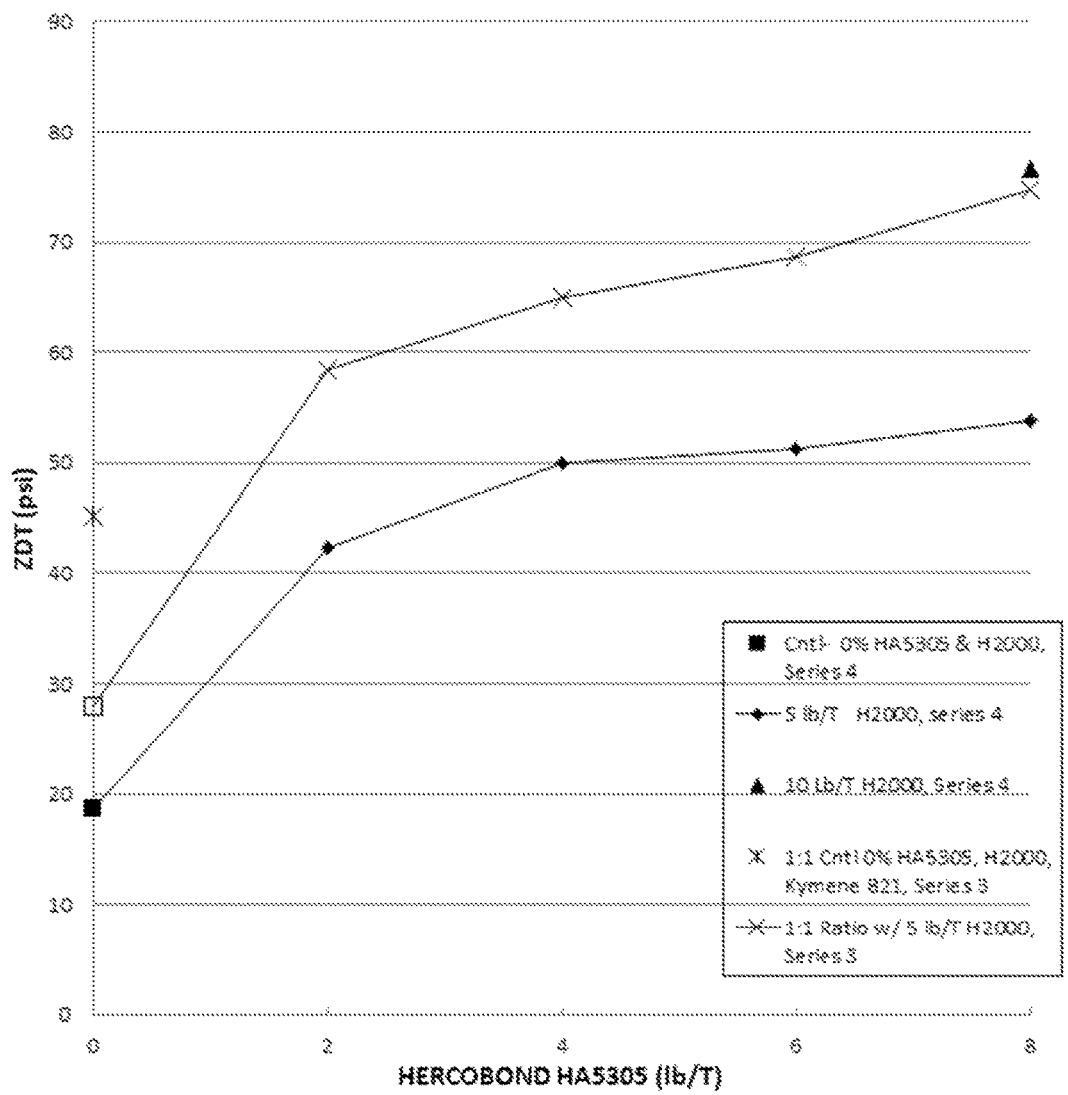
FIG. 5 illustrates the z-direction tensile strength of Cationic POM Dispersant containing papers.

H2000. In addition, FIG. 5 illustrates an improvement in the z-direction tensile strength of a resulting paper with higher concentrations of an amphoteric polymer (i.e., HERCOBOND® HA5305). Such an increase in the z-direction tensile strength can, in various aspects, reduce dusting.

Laminate Contrast Ratio

In another example, the laminate contrast ratio (CR) of, for example, low basis weight paper samples, was evaluated while decreasing the filler content (i.e., $TiO_2$) by from 10% to 20%, or 10% to 30% and replacing the filler with ATH. In this example, the Cationic POM Dispersant or Paper Grade ATH$^+$ Slurry can be added to a slurry of pulp. Cationic POM Dispersant and Cationic $TiO_2$ can then be added to the pulp slurry. The resulting mixture can then be combined with an ATH$^+$ Slurry and a reactive amphoteric polymer and one or more functional wet-end chemicals, such as, for example, cationic starch, an anionic polymer, and/or a cationic wet strength polymer. This resulting mixture can further be combined with one or more wet-end retention aids, such as, for example, cationic PAM, anionic silica, an anionic polymer, and/or PAC-K or PAC-K13. The resulting mixture can then be processed to form a sheet of paper or paperboard.

Figure 6:
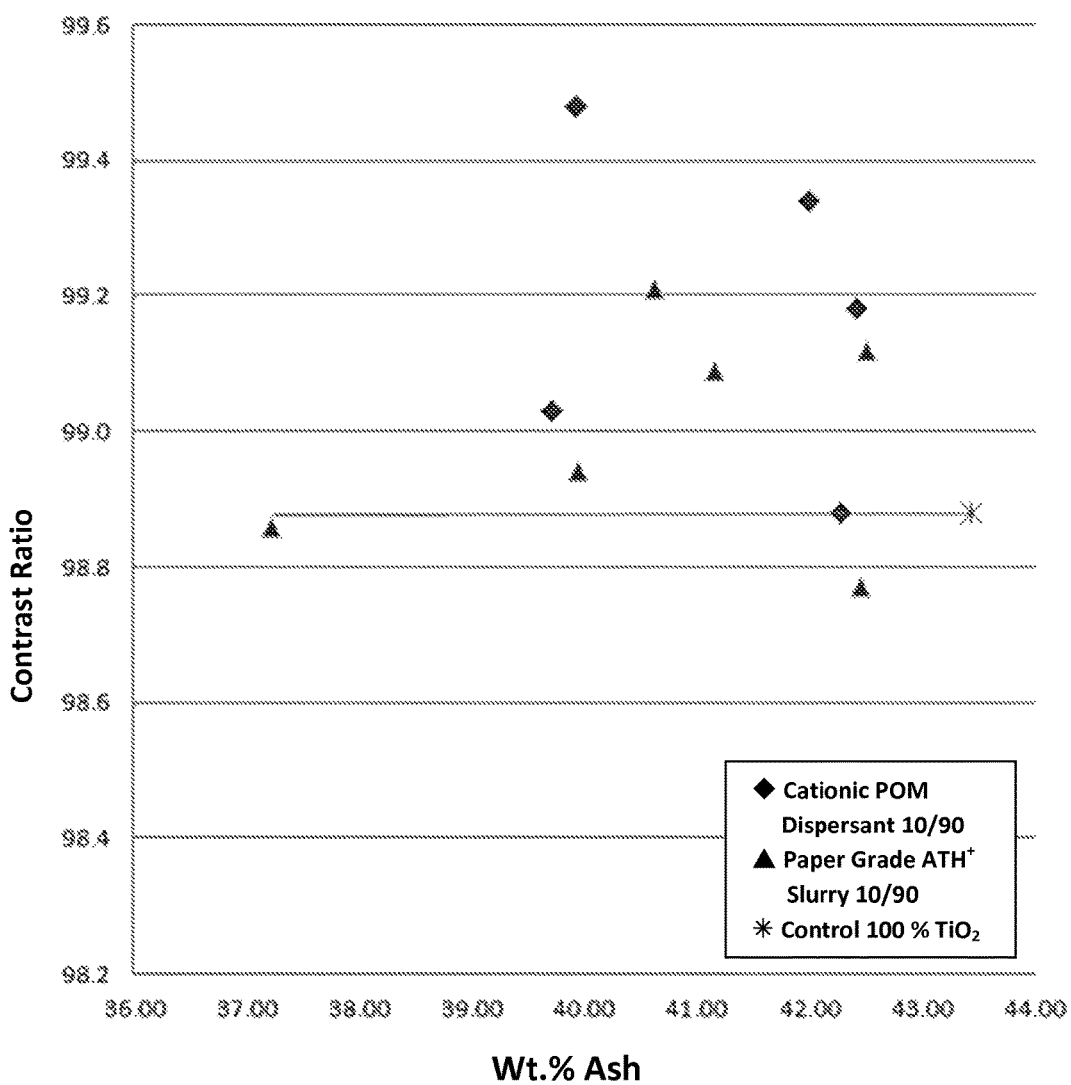
FIG. 6 illustrates the laminate contrast ratio (CR) of Cationic POM Dispersant containing papers.

As illustrated in FIG. 6, the highest laminate contrast ratio was achieved when replacing 10% of the $TiO_2$ with a combination of the Cationic POM Dispersant and a Paper Grade ATH$^+$ Slurry in a 10:90 ratio.

Painted Ground Wood

In yet another example, the $TiO_2$ filler content in low basis weight printing ground wood (GW) paper grades was reduced, while increasing ATH content. In this example, the $TiO_2$ content can be reduced by up to 50%. The Paper Grade ATH$^+$ Slurry can be added to a slurry of pulp. Cationic $TiO_2$ can then be added. The resulting mixture can then be combined with ATH$^+$ and a reactive amphoteric polymer and one or more functional wet-end chemicals, such as, for example, cationic starch and/or an anionic polymer. This resulting mixture can then be combined with one or more wet-end retention aids, such as, for example, cationic PAM and/or bentonite. The resulting mixture can then be processed to form a sheet of paper or paperboard.

Figure 7:
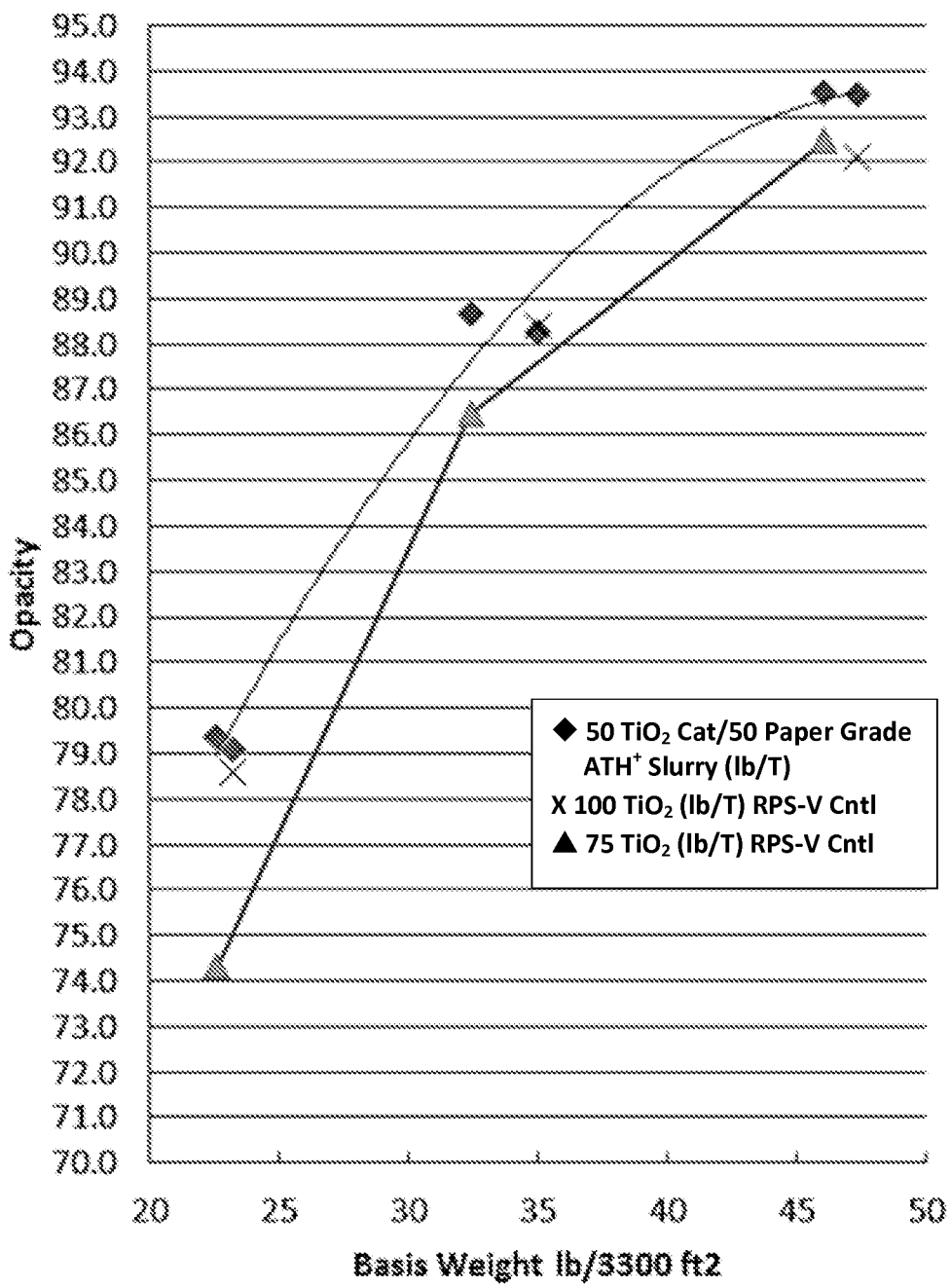
FIG. 7 illustrates the opacity of Cationic POM Dispersant containing papers.
Figure 8:
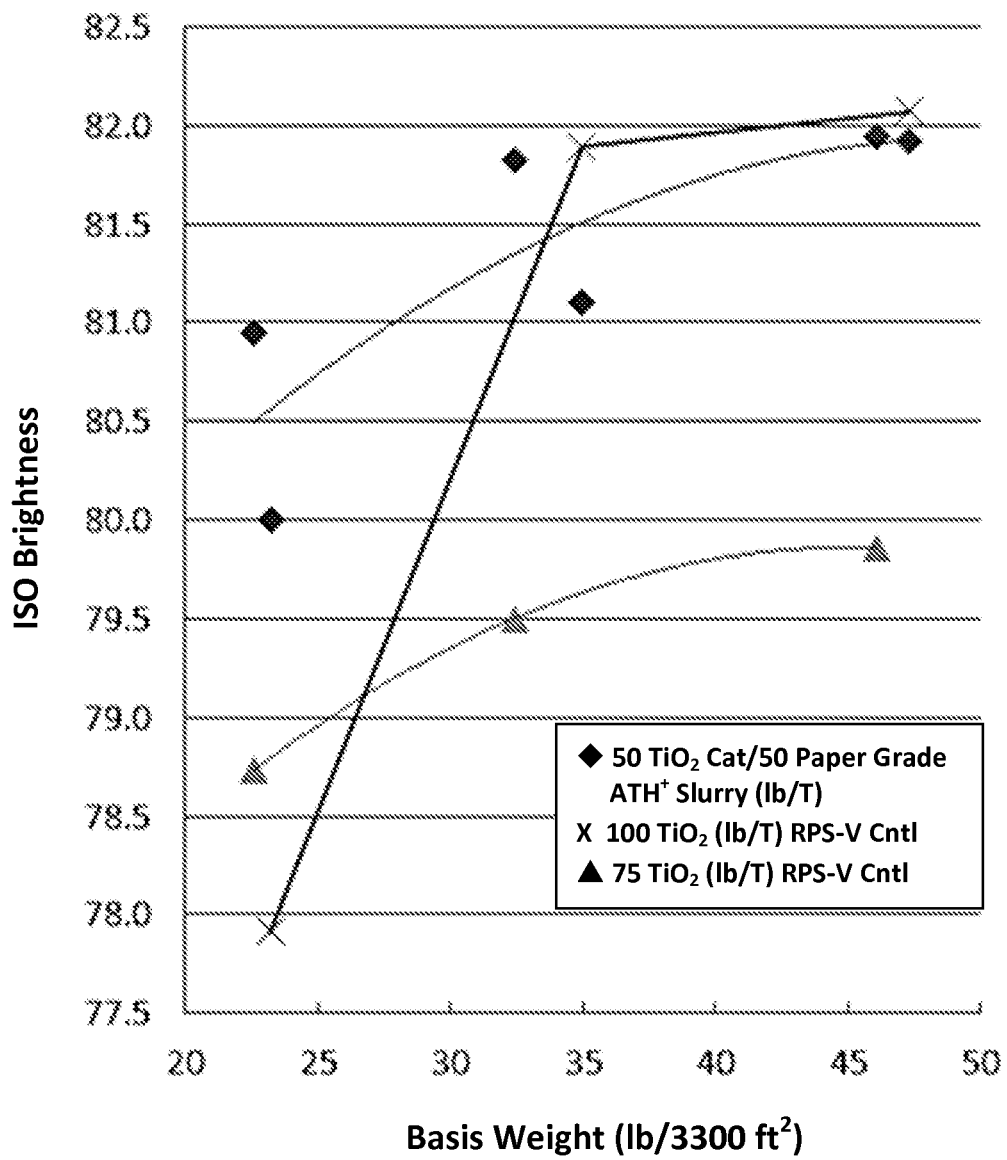
FIG. 8 illustrates the brightness of Cationic POM Dispersant containing papers.

The opacity of papers prepared in this example is illustrated in FIG. 7. A 50/50 sample of $TiO_2$ and the Paper Grade ATH$^+$ Slurry exhibited virtually the same opacity as the sample comprising only $TiO_2$, at the same basis weight. Similarly, FIG. 8 illustrates the brightness of the resulting papers. The brightness of the 50/50 paper sample comprising $TiO_2$ and the Paper Grade ATH$^+$ Slurry was greater than that for paper samples comprising only $TiO_2$ at low basis weights.

What is claimed is:

1. A cationic polyoxometalate-coated alumina tri hydrate dispersant (Cationic POM Dispersant) comprising a reaction product of:
   a. about 40 wt. % to about 70 wt. % of a polyaluminum chloride having a basicity of about 20% to about 40% and an $Al_2O_3$ content of about 10 wt. % to about 17 wt. %; and
   b. about 30 wt. % to about 60 wt. % of crystalline alumina trihydrate (ATH) particles;
   wherein the cationic POM dispersant has a pH of ≤2.5; and
   wherein the cationic POM dispersant comprises cationic POM-coated ATH particles.

2. The Cationic POM Dispersant of claim 1, wherein the crystalline alumina trihydrate particles have an average particle size of about 0.1 μm to about 1 μm.

3. The Cationic POM Dispersant of claim 1, wherein the crystalline alumina trihydrate particles have an average particle size of about 0.2 μm to about 0.5 μm.

4. The Cationic POM Dispersant of claim 1, wherein the polyaluminum chloride has an $Al_{13}[AlO_4Al_{12}(OH)_{24}(H_2O)_{12}^{7+}]$ with Keggin structure content of about 18% to about 31%.

5. The Cationic POM Dispersant of claim 1, wherein the polyaluminum chloride has a basicity of about 25% to about 35%.

6. The Cationic POM Dispersant of claim 1, wherein the polyaluminum chloride has an $Al_2O_3$ content of about 10 wt. % to about 11 wt. %.

7. The Cationic POM Dispersant of claim 1, wherein the polyaluminum chloride has:
   a. a basicity of about 30% to about 32%;
   b. an Ah03 content of about 10 wt. % to about 11 wt. %; and
   c. an $Al_{13}[AlO_4Al_{12}(OH)_{24}(H_2O)_{12}^{7+}]$ with Keggin structure content of about 18% to about 31%.

8. The Cationic POM Dispersant of claim 1, wherein the polyaluminum chloride is comprised of from about 65 to about 75 weight percent water and from about 25 to about 35 weight percent solids.

9. The Cationic POM Dispersant of claim 1, prepared with about 45 to about 55 weight percent crystalline alumina trihydrate particles and about 45 to about 55 weight percent polyaluminum chloride, wherein the polyaluminum chloride is comprised of from about 65 to about 75 weight percent water and from about 25 to about 35 weight percent solids.

10. A cationic slurry, comprising the Cationic POM Dispersant of claim 1 and inorganic particles, in addition to the crystalline alumina trihydrate particles present as part of the Cationic POM Dispersant, selected from the group consisting of alumina trihydrate particles, titanium dioxide, and mixtures thereof.

11. An intermediate cationic alumina trihydrate slurry (Intermediate ATH$^+$ Slurry) comprising:
   a. a Diluted POM Dispersant comprising:
      i. about 5 wt. % to about 14 wt. % of the Cationic POM Dispersant of claim 1; and
      ii. about 86 wt. % to about 95 wt. % water; and
   b. crystalline alumina trihydrate (ATH) particles in addition to the crystalline alumina trihydrate particles present as part of the Cationic POM Dispersant;
   wherein the Intermediate ATH$^+$ Slurry has a pH of between about 2 and about 6.8 and has a total ATH solids content of about 74 wt. % to about 84 wt. %.

12. The Intermediate ATH$^+$ Slurry of claim 11, wherein the Intermediate ATH+ Slurry has a pH of between about 3 and about 6.

13. The Intermediate ATH$^+$ Slurry of claim 11, wherein the about ATH solids content is about 77 wt. % to about 78 wt. %.

14. A paper grade cationic alumina trihydrate slurry comprising
   a. an Intermediate ATH$^+$ Slurry comprising
      i. a Diluted POM Dispersant comprising:
         1. the Cationic POM Dispersant of claim 1; and
         2. water in an amount sufficient to provide a total ATH solids content of about 3 wt. % to about 6 wt. % in the Diluted POM Dispersant; and
      ii. crystalline alumina trihydrate (ATH) particles in addition to the crystalline alumina trihydrate particles present as part of the Cationic POM Dispersant;

wherein the Intermediate ATH⁺ Slurry has a pH of between about 2 and about 6.8 and a total ATH solids content of about 74 wt. % to about 84 wt. %; and
b. water in an amount sufficient to dilute the Intermediate ATH+ Slurry to a total ATH solids content of about 70 wt. % to about 72 wt. %.

15. The paper grade cationic alumina trihydrate slurry of claim 14, wherein the Intermediate ATH⁺ Slurry comprises crystalline alumina trihydrate (ATH) particles having a surface area of from about 0.3 m²/g to about 10 m²/g in addition to the crystalline alumina trihydrate particles present as part of the Cationic POM Dispersant.

16. The paper grade cationic alumina trihydrate slurry of claim 14, wherein the Intermediate ATH⁺ Slurry comprises crystalline alumina trihydrate (ATH) particles having an average particle size of from about 0.1 μm to about 10 μm in addition to the crystalline alumina trihydrate particles present as part of the Cationic POM Dispersant.

17. A paint grade cationic alumina trihydrate slurry comprising:
   a. an Intermediate ATH⁺ Slurry comprising:
      i. a Diluted POM Dispersant comprising:
         1. the Cationic POM Dispersant of claim 1; and
         2. water at an amount sufficient to dilute the Cationic POM Dispersant to a total ATH solids content of about 1 wt. % to about 4 wt. %; and
      ii. crystalline alumina trihydrate (ATH) particles in addition to the crystalline alumina trihydrate particles present as part of the Cationic POM Dispersant;
   wherein the Intermediate ATH⁺ Slurry has a pH of between about 2 and about 6.8 and the total ATH solids content is from about 74 wt. % to about 84 wt. %; and
   b. water in an amount sufficient to dilute the Intermediate ATH⁺ Slurry to a total ATH solids content of about 70 wt. % to about 72 wt. %.

18. The paint grade cationic alumina trihydrate slurry of claim 15, wherein the Intermediate ATH⁺ Slurry comprises crystalline alumina trihydrate (ATH) particles having a surface area of from about 0.3 m²/g to about 10 m²/g in addition to the crystalline alumina trihydrate particles present as part of the Cationic POM Dispersant.

19. The paint grade cationic alumina trihydrate slurry of claim 15, wherein the Intermediate ATH⁺ Slurry comprises crystalline alumina trihydrate (ATH) particles having an average particle size of from about 0.1 μm to about 10 μm in addition to the crystalline alumina trihydrate particles present as part of the Cationic POM Dispersant.

20. A method of making a cationic polyoxometalate-coated alumina trihydrate dispersant (Cationic POM Dispersant) comprising combining
   (a) about 40 wt. % to about 70 wt. % of a polyaluminum chloride having a basicity of about 20% to about 40% and an $Al_2O_3$ content of about 10 wt. % to about 17 wt. % with
   (b) about 30 wt. % to about 60 wt. % of crystalline alumina trihydrate (ATH) particles, wherein the resulting cationic POM dispersant has a pH of: S 2.5 and comprises cationic POM-coated ATH particles.

21. The method of claim 20, wherein the crystalline alumina trihydrate particles have an average particle size of about 0.1 μm to about 1 μm.

22. The method of claim 20, wherein the polyaluminum chloride has an $Al_{13}[AlO_4Al_{12}(OH)_{24}(H_2O)_{12}{}^{7+}]$ with Keggin structure content of about 18% to about 31%.

23. The method of claim 20, wherein the polyaluminum chloride has a basicity of about 25% to about 35%.

24. The method of claim 20, wherein the polyaluminum chloride has an $Al_2O_3$ content of about 10 wt. % to about 11 wt. %.

25. The method of claim 20, wherein the polyaluminum chloride is comprised of from about 65 to about 75 weight percent water and from about 25 to about 35 weight percent solids.

* * * * *